United States Patent
Noto

(10) Patent No.: US 12,050,629 B1
(45) Date of Patent: Jul. 30, 2024

(54) DETERMINING DATA INHERITANCE OF DATA SEGMENTS

(71) Applicant: Ancestry.com DNA, LLC, Lehi, UT (US)

(72) Inventor: Keith D. Noto, San Francisco, CA (US)

(73) Assignee: Ancestry.com DNA, LLC, Lehi, UT (US)

( * ) Notice: Subject to any disclaimer, the term of this patent is extended or adjusted under 35 U.S.C. 154(b) by 0 days.

(21) Appl. No.: 18/377,487

(22) Filed: Oct. 6, 2023

Related U.S. Application Data

(63) Continuation-in-part of application No. 16/936,444, filed on Jul. 23, 2020.

(60) Provisional application No. 63/534,810, filed on Aug. 25, 2023, provisional application No. 63/542,636, filed on Oct. 5, 2023, provisional application No. 62/882,188, filed on Aug. 2, 2019.

(51) Int. Cl.
*G06F 16/28* (2019.01)
*G06F 16/31* (2019.01)

(52) U.S. Cl.
CPC .......... *G06F 16/285* (2019.01); *G06F 16/322* (2019.01)

(58) Field of Classification Search
CPC .............................. G06F 16/285; G06F 16/322
USPC .......................................................... 707/737
See application file for complete search history.

(56) References Cited

U.S. PATENT DOCUMENTS

| | | |
|---|---|---|
| 6,570,567 B1 | 5/2003 | Eaton |
| 7,062,752 B2 | 6/2006 | Simpson et al. |
| 7,249,129 B2 | 7/2007 | Cookson et al. |
| 7,818,281 B2 | 10/2010 | Kennedy et al. |
| 8,510,057 B1 | 8/2013 | Avey et al. |
| 8,769,438 B2 | 7/2014 | Mangum et al. |
| 9,116,882 B1 | 8/2015 | Macpherson et al. |
| 9,213,944 B1 | 12/2015 | Do et al. |
| 9,213,947 B1 | 12/2015 | Do et al. |
| 9,336,177 B2 | 5/2016 | Hawthorne et al. |

(Continued)

FOREIGN PATENT DOCUMENTS

| | | |
|---|---|---|
| WO | WO 02/17190 A1 | 2/2002 |
| WO | WO 2012/099890 A1 | 7/2012 |

(Continued)

OTHER PUBLICATIONS

Allende, C. et al. "Treelink: Data Integration, Clustering and Visualization of Phylogenetic Trees." BMC Bioinformatics, vol. 16, Dec. 2015, pp. 3-6.

(Continued)

*Primary Examiner* — Alexandria Y Bromell
(74) *Attorney, Agent, or Firm* — Fenwick & West LLP

(57) ABSTRACT

A computing device may receive a target data instance. The computing device may identify a plurality of matched segments that match to the target data instance for at least a threshold length. The computing device may define, based on overlapping of the matched segments, the target data instance as a plurality of data string ranges, wherein each divided data string is matched to a set of overlapping matched segments. The computing device may apply an iterative clustering algorithm to group the plurality of data string ranges based on values of a similarity metric among data string ranges that are assigned to a given group. The computing device may attribute a first set of data string ranges that are assigned to a first group to a first inheritance.

20 Claims, 8 Drawing Sheets

(56) References Cited

U.S. PATENT DOCUMENTS

| | | | |
|---|---|---|---|
| 9,367,800 | B1 | 6/2016 | Do et al. |
| 9,836,576 | B1 | 12/2017 | Do et al. |
| 9,864,835 | B2 | 1/2018 | Avey et al. |
| 10,114,922 | B2 | 10/2018 | Byrnes et al. |
| 10,223,498 | B2 | 3/2019 | Han et al. |
| 10,347,365 | B2 | 7/2019 | Wong et al. |
| 10,354,745 | B2 | 7/2019 | Wong et al. |
| 10,558,930 | B2 | 2/2020 | Noto et al. |
| 10,679,729 | B2 | 6/2020 | Ball et al. |
| 2002/0019746 | A1 | 2/2002 | Rienhoff et al. |
| 2002/0143578 | A1 | 10/2002 | Cole et al. |
| 2003/0059808 | A1 | 3/2003 | Liu et al. |
| 2003/0101000 | A1 | 5/2003 | Bader et al. |
| 2003/0113727 | A1 | 6/2003 | Girn et al. |
| 2003/0172065 | A1 | 9/2003 | Sorenson et al. |
| 2004/0083226 | A1 | 4/2004 | Eaton |
| 2004/0093334 | A1 | 5/2004 | Scherer |
| 2004/0126840 | A1 | 7/2004 | Cheng et al. |
| 2005/0089852 | A1 | 4/2005 | Lee et al. |
| 2005/0147947 | A1 | 7/2005 | Cookson et al. |
| 2005/0164704 | A1 | 7/2005 | Winsor |
| 2005/0164705 | A1 | 7/2005 | Rajkotia et al. |
| 2005/0192008 | A1 | 9/2005 | Desai et al. |
| 2007/0050354 | A1 | 3/2007 | Rosenberg |
| 2007/0260599 | A1 | 11/2007 | McGuire et al. |
| 2008/0027656 | A1 | 1/2008 | Parida |
| 2008/0040046 | A1 | 2/2008 | Chakraborty et al. |
| 2008/0081331 | A1 | 4/2008 | Myres et al. |
| 2008/0082955 | A1 | 4/2008 | Andreessen et al. |
| 2008/0113727 | A1 | 5/2008 | Vallejo et al. |
| 2008/0154566 | A1 | 6/2008 | Myres et al. |
| 2008/0162510 | A1 | 7/2008 | Baio et al. |
| 2008/0255768 | A1 | 10/2008 | Martin et al. |
| 2009/0030985 | A1 | 1/2009 | Yuan |
| 2012/0054190 | A1 | 3/2012 | Peters |
| 2012/0191903 | A1 | 7/2012 | Araki et al. |
| 2012/0283108 | A1 | 11/2012 | Sampas |
| 2013/0085728 | A1 | 4/2013 | Tang et al. |
| 2013/0149707 | A1 | 6/2013 | Sorenson et al. |
| 2013/0297221 | A1 | 11/2013 | Johnson et al. |
| 2014/0045705 | A1 | 2/2014 | Bustamante et al. |
| 2014/0067355 | A1 | 3/2014 | Noto et al. |
| 2014/0082568 | A1 | 3/2014 | Hulet et al. |
| 2014/0108527 | A1 | 4/2014 | Aravanis et al. |
| 2014/0278138 | A1 | 9/2014 | Barber et al. |
| 2016/0026755 | A1 | 1/2016 | Byrnes et al. |
| 2017/0213127 | A1 | 7/2017 | Duncan |
| 2017/0220738 | A1 | 8/2017 | Barber et al. |
| 2017/0262577 | A1 | 9/2017 | Ball et al. |
| 2017/0277827 | A1 | 9/2017 | Granka et al. |
| 2019/0139623 | A1 | 5/2019 | Bryc et al. |
| 2021/0034647 | A1* | 2/2021 | Nguyen ............... G16H 10/40 707/707 |

FOREIGN PATENT DOCUMENTS

| | | |
|---|---|---|
| WO | WO 2014/145280 A1 | 9/2014 |
| WO | WO 2016/061260 A1 | 4/2016 |
| WO | WO 2016/061568 A1 | 4/2016 |

OTHER PUBLICATIONS

Bettinger, B., "Clustering Shared Matches," The Genetic Genealogist, Jan. 3, 2017, 16 pages, [online] [Retrieved on Sep. 2, 2020] Retrieved from the Internet <URL: https://thegeneticgenealogist.com/2017/01/03/clustering-shared-matches/>.

Browning, B.L. et al., "A Fast, Powerful Method for Detecting Identity by Descent," The American Journal of Human Genetics, Feb. 11, 2011, vol. 88, No. 2, pp. 173-182.

Browning, B. L. et al., "A Unified Approach to Genotype Imputation and Haplotype Phase Inference for Large Data sets of Trios and Unrelated Individuals," The American Journal of Human Genetics, Feb. 13, 2009, pp. 210-223, vol. 84.

Browning, B.L. et al., "Efficient Multilocus Association Testing for Whole Genome Association Studies Using Localized Haplotype Clustering," Genetic Epidemiology, vol. 31, Feb. 26, 2007, pp. 365-375.

Browning, B. L. et al. "Fast Two-Stage Phasing of Large-Scale Sequence Data." The American Journal of Human Genetics, vol. 108, Oct. 7, 2021, pp. 1880-1890.

Browning, B. L. et al., "Improving the Accuracy and Efficiency of Identity by Descent Detection in Population Data," Genetics, Jun. 2013, pp. 459-471, vol. 194.

Browning, S.R. et al., "Haplotype Phasing: Existing Models and New Developments," Nature Reviews Genetics, Oct. 2011, pp. 703-714, vol. 12.

Browning, S.R., "Multilocus Association Mapping Using Variable-Length Markov Chains," American Journal of Human Genetics, Apr. 7, 2006, pp. 903-913, vol. 78, No. 6.

Browning, S.R. et al., "Rapid and Accurate Haplotype Phasing and Missing-Data Inference for Whole-Genome Association Studies by Use of Localized Haplotype Clustering," American Journal of Human Genetics, vol. 81, Nov. 2007, pp. 1084-1096.

Cooper, K., "More Automated DNA Match Clustering!," Kitty Cooper's Blog, Dec. 30, 2018, 13 pages, [Online] [Retrieved on Nov. 16, 2023] Retrieved from the Internet <URL:https://blog.kittycooper.com/2018/12/more-automated-dna-match-clustering/>.

Delaneau, O. et al. "Integrating Sequence and Array Data to Create an Improved 1000 Genomes Project Haplotype Reference Panel." Nature Communications, vol. 5, Jun. 13, 2014, pp. 1-9.

Delaneau, O. et al. Accurate, Scalable and Integrative Haplotype Estimation, Nature Communications, vol. 10, No. 1, Nov. 28, 2019, pp. 1-10.

DNA Painter, "Convert Autocluster Table to Spreadsheet Format," Dec. 5, 2018, one pages, [Online] [Retrieved on Sep. 2, 2020] Retrieved from the Internet <URL:https://dnapainter.com/tools/convertac>.

Druet, T., et al., "A Hidden Markov Model Combining Linkage and Linkage Disequilibrium Information for Haplotype Reconstruction and Quantitative Trait Locus Fine Mapping," Genetics, Mar. 2010, pp. 789-798, vol. 184, No. 3.

Dudoit, S. et al., "A score test for the linkage analysis of qualitative and quantitative traits based on identity by descent data from sib-pairs," Biostatistics, vol. 1, Iss. 1, Mar. 2000, pp. 1-26.

Durand, E.Y. et al., "Reducing Pervasive False-Positive Identical-by-Descent Segments Detected by Large-Scale Pedigree Analysis," Molecular Biology and Evolution, Apr. 30, 2014, pp. 2212-2222, vol. 31, No. 8.

Durbin, R. M. et al., "A Map of Human Genome Variation from Population-Scale Sequencing," Nature, Oct. 28, 2010, pp. 1061-1073, vol. 467.

Elston, R.C. et al., "A General Model for the Genetic Analysis of Pedigree Data," Human Heredity, 1971, pp. 523-542, vol. 21, No. 6.

Falush, D. et al., "Inference of Population Structure Using Multilocus Genotype Data: Linked Loci and Correlated Allele Frequencies," Genetics, vol. 164, Aug. 2003, pp. 1567-1587.

Genetic Affairs, "AutoCluster for Marcos Bradford—DNA account: Weimer Berkeley," Genetic Affairs, Nov. 30, 2018, 4 pages, [Online] [Retrieved on Nov. 16, 2023] Retrieved from the Internet <URL:http://geneticaffairs.com/auto_cluster/examples/autocluster_2nd_3rd.html>.

Griffiths, B., "Shared matches—matches who match both my paternal and maternal lines," Not Just the PARRYs, Aug. 9, 2017, 5 pages, [Online] [Retrieved on Nov. 16, 2023] Retrieved from the Internet <URL:http://notjusttheparrys.blogspot.com/2017/08/shared-matches-matches-who-match-both.html>.

Gusev, A. et al., "Whole Population, Genome-wide Mapping of Hidden Relatedness," Genome Research, 2009, pp. 318-326, vol. 19.

Henn, B. M. et al. "Cryptic Distant Relatives are Common in Both Isolated and Cosmopolitan Genetic Samples." PLoS ONE, vol. 7, No. 4, Apr. 2012, pp. 1-13.

Jarvis, J.P. et al., "Patterns of Ancestry of Natural Selection and Genetic Association with Stature in Western African Pygmies," PLoS Genetics, vol. 8, Iss. 4, Apr. 26, 2012, pp. 1-15.

(56) References Cited

OTHER PUBLICATIONS

Kenny, E.E. et al., "Increased Power of Mixed Models Facilitates Association Mapping of 10 Loci for Metabolic Traits in an Isolated Population," Human Molecular Genetics, Feb. 15, 2011, pp. 827-839, vol. 20, No. 4.
Kong, A. et al. "Detection of Sharing by Descent, Long-Range Phasing and Haplotype Imputation," Nature Genetics, Author Manuscript, Sep. 2008, vol. 40, No. 9, pp. 1-22.
Lander, E.S. et al., "Construction of Multilocus Genetic Linkage Maps in Humans," Proc. Nat. Acad. Sci., Apr. 1987, pp. 2363-2367, vol. 84.
Li, H. et al., "Relationship Estimation from Whole-Genome Sequence Data," PLOS Genetics, Jan. 30, 2014, e1004144, pp. 1-12, vol. 10, No. 1.
Li, Y. et al., "Haplotype Reconstruction in Large Pedigrees with Untyped Individuals through IBD reference," Journal of Computational Biology, Nov. 2011, vol. 18, No. 11, pp. 1411-1421.
Li, Y. et al., "MaCH: Using Sequence and Genotype Data to Estimate Haplotypes and Unobserved Genotype," Genetic Epidemiology, Nov. 5, 2010, pp. 816-834, vol. 34, No. 8.
Livne, O.E. et al., "PRIMAL: Fast and Accurate Pedigree-based Imputation from sequence data in a Founder Population," PLOS Computational Biology, Mar. 3, 2015, vol. 11, No. 3, pp. 1-14.
Loh, P-R. et al. "Reference-Based Phasing Using the Haplotype Reference Consortium Panel." Nature Genetics, Author Manuscript, vol. 48, No. 11, Nov. 2016, pp. 1-20.
Meuwissen, T. et al., "The Use of Family Relationships and Linkage Disequilibrium to Impute Phase and Missing Genotypes in Up to Whole Genome Sequence Density Genotypic Data," Genetics, Aug. 2010, pp. 1441-1449, vol. 185.
Morrison, A.C. et al., "Prediction of Coronary Heart Disease Risk using a Genetic Risk Score: The Atherosclerosis Risk in Communities Study," American Journal of Epidemiology, vol. 166, No. 1, Apr. 18, 2007, pp. 28-35.
Naseri, A. et al. "RaPID: Ultra-Fast, Powerful, and Accurate Detection of Segments Identical by Descent (IBD) in Biobank-Scale Cohorts." Genome Biology, vol. 20, Jul. 25, 2019, pp. 1-15.
Noto, K. et al. "Accurate Genome-Wide Phasing from IBD Data." BMC Bioinformatics, vol. 23, Nov. 23, 2022, pp. 1-16.
Ott, J., "Estimation of the Recombination Fraction in Human Pedigrees: Efficient Computation of the Likelihood for Human Linkage Studies," American Journal of Human Genetics, 1974, pp. 588-597, vol. 26, No. 5.
Palin, K. et al., "Identity-by-Descent-Based Phasing and Imputation in Founder Populations Using Graphical Models," Genetic Epidemiology, vol. 35, Oct. 17, 2011, pp. 853-860.
Pedregosa, F. et al. "Scikit-learn: Machine Learning in Python." Journal of Machine Learning Research, vol. 12, Oct. 2011, pp. 2825-2830.
Platt, J.C., "Probabilistic Outputs for Support Vector Machines and Comparisons to Regularized Likelihood Methods," Mar. 26, 1999, pp. 1-11.
Price, A.L. et al., "Sensitive Detection of Chromosomal Segments of Distinct Ancestry in Admixed Populations," PLoS Genetics, vol. 5, Iss. 6, Jun. 2009, pp. 1-18.
Purcell, S. et al., "Plink: A tool set for whole-genome association and population-based linkage analyses," The American Journal of Human Genetics, vol. 81, Sep. 2007, pp. 559-575.
Qian, Y. et al., "Efficient clustering of identity-by-descent between multiple individuals," Bioinformatics, vol. 30, No. 7, Dec. 19, 2013, pp. 915-922.
Rabiner, L.R., "A Tutorial on Hidden Markov Models and Selected Applications in Speech Recognition," Proceedings of the IEEE, vol. 77, No. 2, Feb. 1989, pp. 257-286.
Ramstetter, M. D. et al., "Inferring Identical-by-Descent Sharing of Sample Ancestors Promotes High- Resolution Relative Detection," The American Journal of Human Genetics, vol. 103, Jul. 5, 2018, pp. 30-44.
Rocchi, M., et al., "Ancestral genomes reconstruction: An integrated, multi-disciplinary approach is needed," Genome Research, Oct. 2006, pp. 1441-1444, vol. 16, No. 12.
Ron, D. et al., "On the Learnability and Usage of Acyclic Probabilistic Finite Automata," Journal of Computer and System Sciences, vol. 56, 1998, pp. 133-152.
Scheet, P. et al., "A Fast and Flexible Statistical Model for Large-Scale Population Genotype Data: Applications to Inferring Missing Genotypes and Haplotypic Phase," The American Journal of Human Genetics, vol. 78, Feb. 17, 2006, pp. 629-644.
Seligsohn, U. et al., "Genetic Susceptibility to Venous Thrombosis," The New England Journal of Medicine, vol. 344, No. 16, Apr. 19, 2001, pp. 1222-1231.
Speed, D. et al., "Relatedness in the post-genomic era: is it still useful?" Nature Reviews Genetics, Jan. 2015, vol. 16, No. 1, pp. 33-45.
Staples, J. et al., "Primus: Rapid Reconstruction of Pedigrees from Genome-wide Estimates of Identity by Descent," The American Journal of Human Genetics, vol. 95, Nov. 6, 2014, pp. 553-564.
Sticca, E. L. et al. "Current Developments in Detection of Identity-by-Descent Methods and Applications." Frontiers in Genetics, vol. 12, Sep. 2021, pp. 1-6.
Sundquist, A. et al., "Effect of Genetic Divergence in Identifying Ancestral Origin using HAPAA," Genome Res., vol. 18, Mar. 18, 2008, pp. 676-682.
Tewhey, R. et al. "The Importance of Phase Information for Human Genomics." Nature Reviews Genetics, vol. 12, Mar. 2011, pp. 215-223.
The International Hapmap 3 Consortium, "Integrating common and rare genetic variation in diverse human populations," Nature, vol. 467, Sep. 2, 2010, pp. 52-58.
Thompson, E.A., "Identity by Descent: Variation in Meiosis, Across Genomes, and in Populations," Genetics, Jun. 2013, pp. 301-326, vol. 194.
Thompson, E. A. "Statistical Inference from Genetic Data on Pedigrees," NSF-CBMS Regional Conference Series in Probability and Statistics, 2000, 186 pages, vol. 6.
Tipping, M.E., "Sparse Bayesian Learning and the Relevance Vector Machine," Journal of Machine Learning Research, Jun. 2001, pp. 211-244.
Visscher, P.M et al., "Heritability in the genomics era-concepts and misconceptions," Nature Reviews Genetics, Mar. 4, 2008, pp. 255-266.
Weedon, M.N. et al., "Combining Information from Common Type 2 Diabetes Risk Polymorphisms Improves Disease Prediction," PLoS Med., vol. 3, Iss. 10, Oct. 2006, pp. 1877-1882.
Welch, B. L., "The Generalization of "Student's" Problem When Several Different Population Variances are Involved," Biometrika, Jan. 1947, pp. 28-35, vol. 34, Issue 1-2.
Williams, A.L. et al., "Phasing of Many Thousands of Genotyped Samples," American Journal of Human Genetics, Aug. 10, 2012, pp. 238-251, vol. 91, No. 2.
Yang, Q. et al., "Improving the Prediction of Complex Diseases by Testing for Multiple Disease-Susceptibility Genes," American Journal of Human Genetics, vol. 72, Feb. 14, 2003, pp. 636-649.
youtube.com, "Merry DNA Christmas—Family History Fanatics Live," Family History Fanatics, Dec. 14, 2018, one page, [Online] [Retrieved on Nov. 16, 2023] Retrieved from the Internet <URL: https://www.youtube.com/watch?v=--eruCeJ9_8>.
Yoon, B-J., "Hidden Markov Models and their Applications in Biological Sequence Analysis," Current Genomics, vol. 10, Sep. 2009, pp. 402-415.

\* cited by examiner

US 12,050,629 B1

DETERMINING DATA INHERITANCE OF DATA SEGMENTS

CROSS-REFERENCE TO RELATED APPLICATIONS

The present application claims the benefit of U.S. Provisional Patent Application No. 63/534,810, filed on Aug. 25, 2023, and U.S. Provisional Patent Application No. 63/542,636, filed on Oct. 5, 2023. The present application is also a continuation-in-part of U.S. application Ser. No. 16/936,444, filed on Jul. 23, 2020, which claims priority from a provisional application No. 62/882,188, filed on Aug. 2, 2019. All of the above referenced applications are hereby incorporated by reference in their entirety.

FIELD

The disclosed embodiments relate to linking datasets in a database and more specifically to linking datasets by using a clustering technique.

BACKGROUND

A large-scale database such as a database of an online database that has millions of users can include billions of data records. This type of database may allow users to build make meaningful discoveries through examining various data records. Users may try to identify relevant data in the database. However, identifying relevant data in the sheer amount of data is not a trivial task. Datasets associated with different individuals or events may not be connected without a proper determination of how the datasets are related. Comparing a large number of datasets without a concrete strategy may also be computationally infeasible because each dataset may also include a large number of data bits. Given an individual dataset and a database with datasets that are potentially related to the individual dataset, it is often challenging to identify a dataset in the database that is associated with the individual dataset.

Data may be inherited and evolved based on real-world events that are not always recorded or documented. Yet, while the real-world events may not be completely documented, the change and inheritance of those events may be traceable through the change among data instances. For example, two data instances may be generated independently and individually reflect the status of two events, the natures or characteristics of two apparently unrelated named entities, or any combination of natures. However, the two data instances or corresponding events or named entities may be inherited from one or more common sources so that the two data instances share some similarities in the data.

SUMMARY

In some embodiments, the techniques described herein relate to a computer-implemented method for determining data inheritance of data segments, the computer-implemented method including: receiving a target data instance: identifying a plurality of matched data segments that match to the target data instance for at least a threshold length: defining, based on overlapping of the matched data segments, the target data instance as a plurality of data string ranges, wherein each divided data string range is matched to a set of overlapping matched data segments: applying an iterative clustering algorithm to group the plurality of data string ranges based on values of a similarity metric among data string ranges that are assigned to a given group: and attributing a first set of data string ranges that are assigned to a first group to a first data inheritance.

In some embodiments, the target data instance is a structured data instance, and the iterative clustering algorithm assigns the first set of data string ranges to a first data inheritance source belong to the first data inheritance and the iterative clustering algorithm assigns a second set of data string ranges to a second data inheritance source.

In some embodiments, the matched data segments are retrieved from a database of close data matches, each close data match sharing a total length with the target data instance for at least a second threshold length that is larger than the threshold length.

In some embodiments, defining the target data instance as a plurality of data string ranges includes: identifying a plurality of informative sites, an informative site being a site with heterogeneous position-specific data string value values in the target data instance and a homogeneous data value in two or more matched data segments, identifying a conflicting informative site, the conflicting informative site being an informative site where the two or more matched data segments have contradicting homozygous position-specific data string values at the conflicting informative site, breaking up at least one of the matched data segments of the two or more matched data segments at a breakpoint based on the conflicting informative site, and delimiting two data string ranges of the target data instance at the breakpoint.

In some embodiments, the iterative clustering algorithm includes: examining a first candidate assignment that assigns a first candidate set of data string ranges to a given group, determining a first value of the similarity metric of the first candidate set, examining a second candidate assignment that assigns a second candidate set of data string ranges to the given group, determining a second value of the similarity metric of the second candidate set, and selecting the second candidate assignment.

In some embodiments, the iterative clustering algorithm includes two or more stages, and the two or more stages include a first clustering tree stage and a refinement stage.

In some embodiments, the iterative clustering algorithm includes: constructing a similarity matrix for the plurality of data string ranges, the similarity matrix includes values of the similarity metric of two given data string ranges, constructing a clustering tree that assigns, based on the values in the similarity matrix, the plurality of data string ranges into positions of nodes in the clustering tree, and dividing the clustering tree into two or more branches, each branch including a plurality of nodes and corresponding to a group assignment.

In some embodiments, the iterative clustering algorithm includes: examining a candidate assignment, determining an objective function is based on the similarity metric, swapping, iteratively, one or more data string ranges from a first group to a second group or vice versa to improve a value of the objective function.

In some embodiments, the objective function is further based on a distribution of real-life data events.

In some embodiments, a value of the similarity metric of two given data string ranges is determined based on lengths of matched data segments corresponding to a matched data instance whose segments are classified as matched data segments in both of the two given data string ranges.

In some embodiments, a value of the similarity metric of two given data string ranges is determined further based on (1) a first length of data string matched segment corresponding to a matched data instance in a first data string range of the two given data string ranges and (2) a second length of data string matched segment correspond to the matched data instance's second-degree relative in a second data string range of the two given data string ranges.

In some embodiments, the techniques described herein relate to a computer-implemented method, further including performing a filtering to remove one or more matched data segments prior to applying the iterative clustering algorithm, wherein the filtering includes: determining one or more candidate matched data segments belonging to potential descendant of two or more data inheritances, identifying, from the one or more candidate matched data segments, a data string matched segment that belong to a descendant of the two or more data inheritances, and removing the identified data string matched segment.

In some embodiments, the techniques described herein relate to a computer-implemented method, further including: applying the iterative clustering algorithm again to the first set of data string ranges of the target data instance to group the first set of data string ranges into at least a subset of data string ranges, the subset of data string ranges an earlier data inheritance in the first data inheritance.

In some embodiments, the techniques described herein relate to a computer-implemented method, further including: identifying a data expression: determining the data expression is attributable to position-specific data string values in the first set of data string ranges: and reporting that the data expression of the target data instance is passed down from the first data inheritance.

In some embodiments, the plurality of matched data segments are matched based on data bits.

In some embodiments, the techniques described herein relate to a system including: one or more processors: and memory configured to store code including instructions, wherein the instructions, when executed by the one or more processors, cause the one or more processors to perform: receiving a target data instance: identifying a plurality of matched data segments that match to the target data instance for at least a threshold length; defining, based on overlapping of the matched data segments, the target data instance as a plurality of data string ranges, wherein each divided data string range is matched to a set of overlapping matched data segments: applying an iterative clustering algorithm to group the plurality of data string ranges based on values of a similarity metric among data string ranges that are assigned to a given group: and attributing a first set of data string ranges of the target data instance that are assigned to a first group to a first data inheritance.

In some embodiments, the techniques described herein relate to a system, wherein the target data instance is a structured data instance, and the iterative clustering algorithm assigns the first set of data string ranges to a first data inheritance source belong to the first data inheritance and the iterative clustering algorithm assigns a second set of data string ranges to a second data inheritance source.

In some embodiments, the techniques described herein relate to a system, wherein the matched data segments are retrieved from a database of close data matches, each close data match sharing IBD with the target data instance for at least a second threshold length that is larger than the threshold length.

In some embodiments, the techniques described herein relate to a system, wherein defining the target data instance as a plurality of data string ranges includes: identifying a plurality of informative sites, an informative site being a site with heterogeneous position-specific data string value values in the target data instance and a homogeneous data value in two or more matched data segments, identifying a conflicting informative site, the conflicting informative site being an informative site where the two or more matched data segments have contradicting homozygous position-specific data string values at the conflicting informative site, breaking up at least one of the matched data segments of the two or more matched data segments at a breakpoint based on the conflicting informative site, and delimiting two data string ranges of the target data instance at the breakpoint.

In some embodiments, the techniques described herein relate to a non-transitory computer-readable medium configured to store code including instructions, wherein the instructions, when executed by one or more processors, cause the one or more processors to perform: receiving a target data instance: identifying a plurality of matched data segments that match to the target data instance for at least a threshold length: defining, based on overlapping of the matched data segments, the target data instance as a plurality of data string ranges, wherein each divided data string range is matched to a set of overlapping matched data segments: applying an iterative clustering algorithm to group the plurality of data string ranges based on values of a similarity metric among data string ranges that are assigned to a given group: and attributing a first set of data string ranges of the target data instance that are assigned to a first group to a first data inheritance.

In some embodiments, a non-transitory computer readable medium that is configured to store instructions is described. The instructions, when executed by one or more processors, cause the one or more processors to perform a process that includes steps described in the above computer-implemented methods or described in any embodiments of this disclosure. In some embodiments, a system may include one or more processors and a storage medium that is configured to store instructions. The instructions, when executed by one or more processors, cause the one or more processors to perform a process that includes steps described in the above computer-implemented methods or described in any embodiments of this disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

Figure 1:
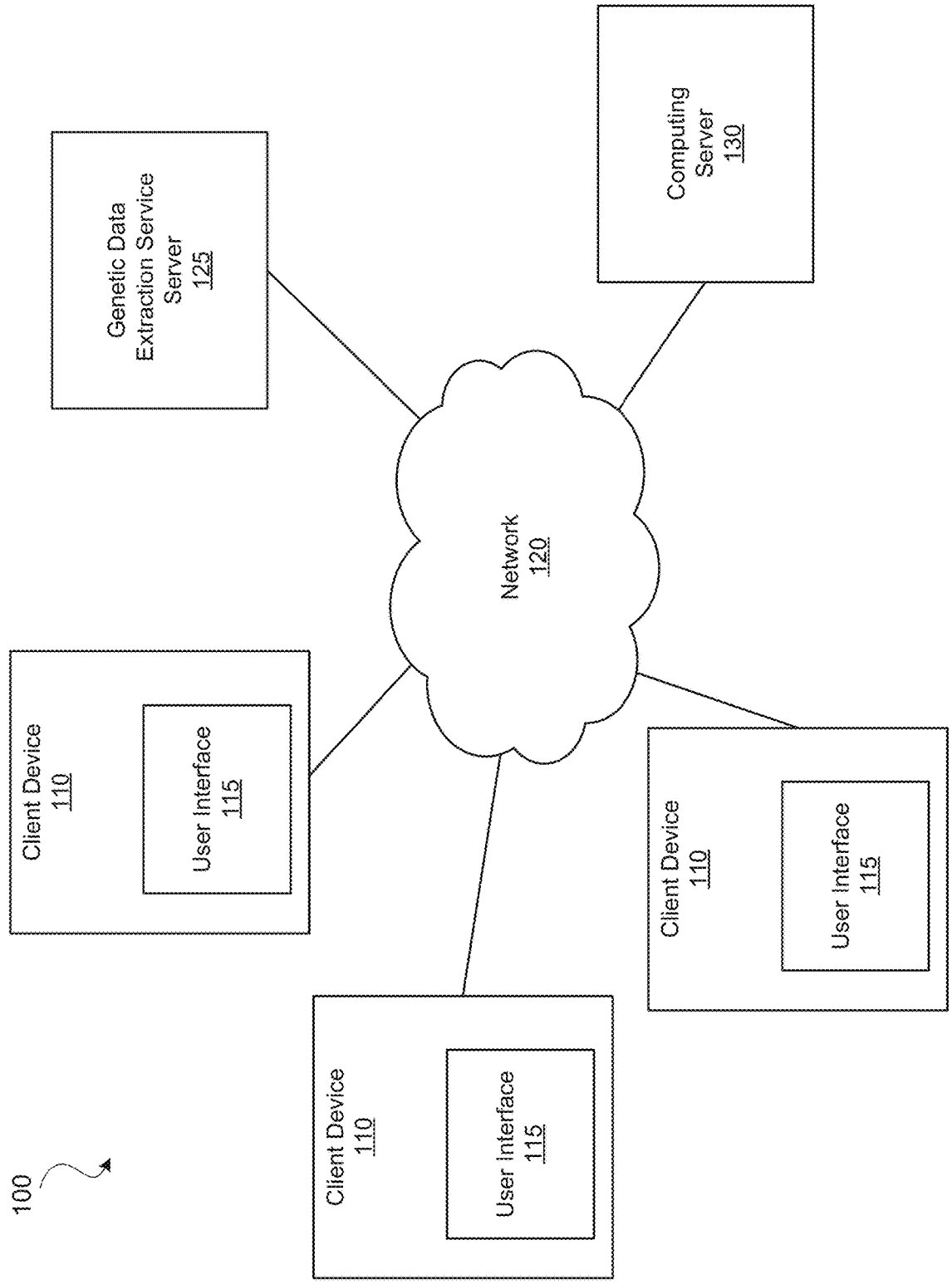
FIG. 1 illustrates a diagram of a system environment of an example computing system, in accordance with some embodiments.

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IOT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more subnetworks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers. In some embodiments, each SNP site may have two readings that are heterogeneous.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2A:
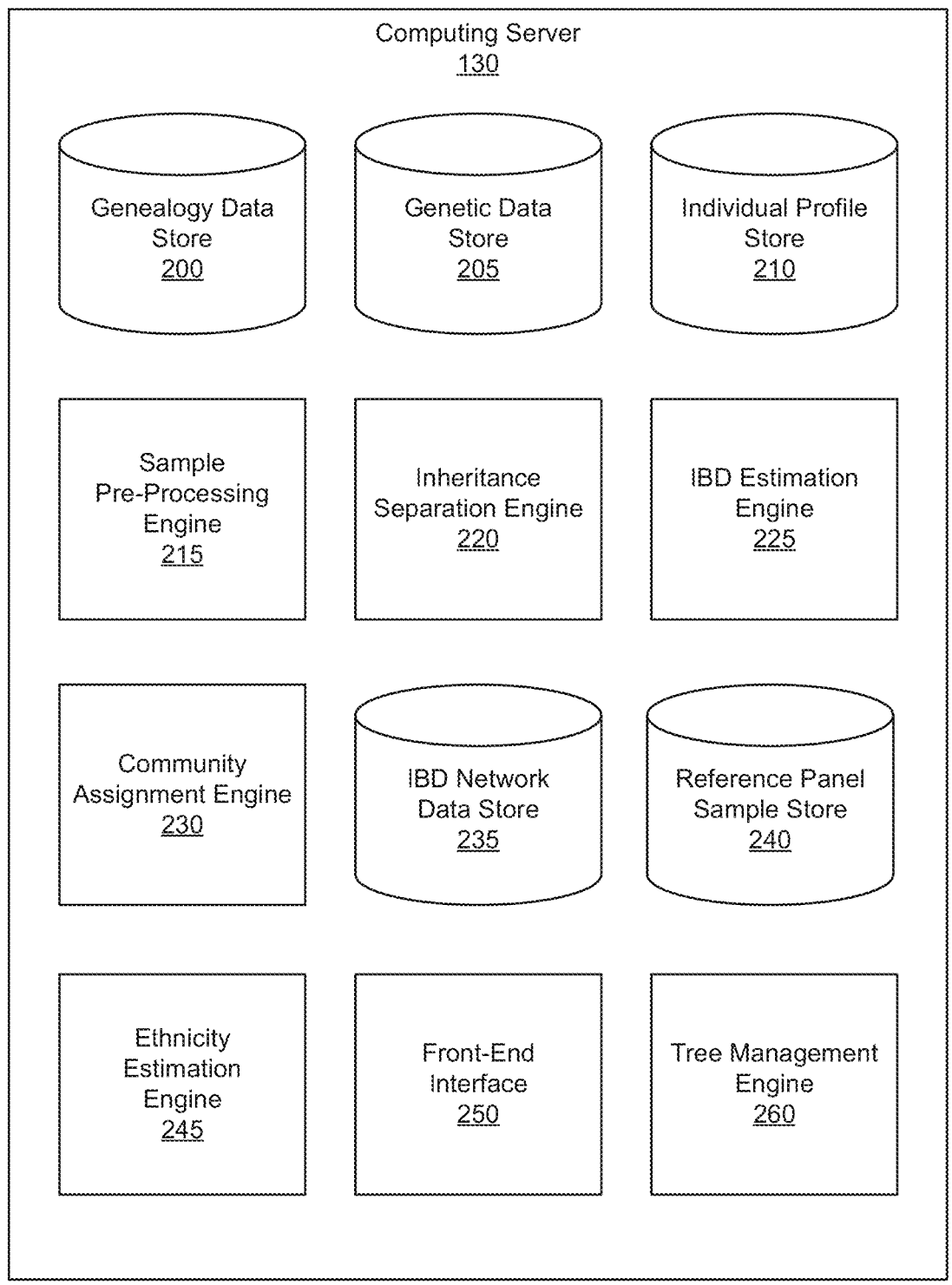
FIG. 2A is a block diagram of an architecture of an example computing system, in accordance with some embodiments.

FIG. 2A is a block diagram of an architecture of an example computing server 130, in accordance with some embodiments. In the embodiment shown in FIG. 2A, the computing server 130 includes a genealogy data store 200, a genetic data store 205, an individual profile store 210, a sample pre-processing engine 215, an inheritance separation engine 220, an identity by descent (IBD) estimation engine 225, a community assignment engine 230, an IBD network data store 235, a reference panel sample store 240, an ethnicity estimation engine 245, a front-end interface 250, and a tree management engine 260. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. An ancestor here does not imply that the person is deceased. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may also be referred to as a genomic dataset, which may include a digital dataset of nucleotide data (e.g., SNP data), SNP positions, and corresponding metadata. A genomic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP sites (e.g., allele sites) filtered from the sequencing results. A SNP site that is single base pair long may also be referred to a SNP locus. A SNP site may be associated with a unique identifier. The genetic dataset may be in a form of diploid data that includes a sequencing of genotypes, such as genotypes at the target SNP site, or the whole base pair sequence that includes genotypes at known SNP site and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles at each SNP site. The pair of alleles may be homozygous (e.g., A-A or G-G) or heterogeneous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterogeneous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g., stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and research conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the inheritance separation engine 220 which phases the individual's diploid genotypes to generate a pair of haplotypes for each user.

The inheritance separation engine 220 may separate genetic data of individuals into genomic ranges that determine how each genomic range may be inherited from an ancestor. For example, the inheritance separation engine 220 may phase diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterogeneous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The inheritance separation engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The inheritance separation engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the inheritance separation engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The inheritance separation engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

A phasing algorithm may also generate phasing result that has a long-distance accuracy in terms of haplotype separation. For example, in some embodiments, a jig phasing algorithm may be used, which is described in further detail in U.S. Patent Application Publication No. US 2021/0034647, entitled "Clustering of Matched Segments to Determine Linkage of Dataset in a Database," published on Feb. 4, 2021. For example, the computing server 130 may receive a target individual genotype dataset and a plurality of additional individual genotype datasets that include haplotypes of additional individuals. For example, the additional individuals may be reference panels or individuals who are linked (e.g., in a family tree) to the target individual. The computing server 130 may generate a plurality of subcluster pairs of first parental groups and second parental groups. Each subcluster pair may be in a window. The window may correspond to a genomic segment and has a similar concept of window used in the ethnicity estimation engine 245 and the rest of the disclosure related to HMMs, but how windows are precisely divided and defined may be the same or different in the inheritance separation engine 220 and in an HMM. Each subcluster pair may correspond to a genetic locus. In some embodiments, each subcluster pair may have a first parental group that includes a first set of matched haplotype segments selected from the plurality of additional individual datasets and a second parental group that includes a second set of matched haplotype segments selected from the plurality of additional individual datasets. The computing server 130 may generate a super-cluster of a parental side by linking the first parental groups and the second parental groups across a plurality of genetic loci (across a plurality of subcluster pairs). Generating the super-cluster of the parental side may include generating a candidate parental side assignment of parental groups across a set of subcluster pairs that represent a set of genetic loci in the plurality of genetic loci. The computing server 130 may determine a number of common additional individual genotype datasets that are classified in the candidate parental side assignment. The computing server 130 may determine the candidate parental side assignment to be part of the super-cluster based on the number of common additional individual genotype datasets. Any suitable algorithms may be used to generate the super-cluster, such as a heuristic scoring approach, a bipartite graph approach, or another suitable approach. The computing server 130 may generate a haplotype phasing of the target individual from the super-cluster of the parental side.

In some embodiments, the phasing of haplotypes may be the first level of separation in inheritance separation. The inheritance separation engine 220 may use an inheritance separation process to further separate DNA material from one parent into DNA materials of two grandparents. At an even higher level of separation, the DNA materials of a grandparent may be further separated into higher-level ancestors.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine subclusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the subclusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230) may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020 and U.S. Pat. No. 10,692,587, granted on Jun. 23, 2020, entitled "Global Ancestry Determination System" describe different example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130) may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260) may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and those in the potential family trees through one or more machine learning models or other heuristic algorithms. For example, the tree management engine 260) may try putting the target individual in various possible locations in the family tree and determine the highest probability position(s) based on the genetic dataset of the target individual and genetic datasets available for others in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 30, 2022, describes example embodiments of how an individual may be linked to existing family trees.

Example Data Inheritance Determination

Data may be inherited and evolved based on real-world events that are not always recorded or documented. Yet, while the real-world events may not be completely documented, the change and inheritance of those events may be traceable by comparing data strings among data instances. For example, two data instances may be generated independently and individually reflect the status of their respective named entities or events. The data patterns in the data instances may reflect the natures, histories, or characteristics of data inheritance sources such as related or unrelated named entities or events. However, multiple data instances or corresponding named entities or events may be inherited from one or more common sources so that the data instances share some similarities in the data pattern. As such, the nature of inheritance may be revealed by analyzing and comparing the multiple data instances, and sometimes a large number of data instances. Those real-life events that result in shared data strings among data instances may be referred to as data inheritance events, even though those real-life events, at the time of the occurrence, may not involve data or data generation at all. For example, the real-life events may be historical events that occurred before the invention of computer or data but present data instances may still reflect those historical events.

In some cases, however, only portions of data strings are inherited from a data inheritance event and the precise locations and extent of inheritance are not apparent without a complex process to analyze and compare the one or more data instances. In some cases, for a given data instance, it may be difficult to identify how various portions of the data instance are inherited from different real-world events or named entities. A data instance may inherit data from various sources that are referred to as inheritance sources. Various processes described herein provide solutions to identify inheritance sources of a data instance by analyzing the data patterns in other data instances and identifying how data are passed down.

Figure 2B:
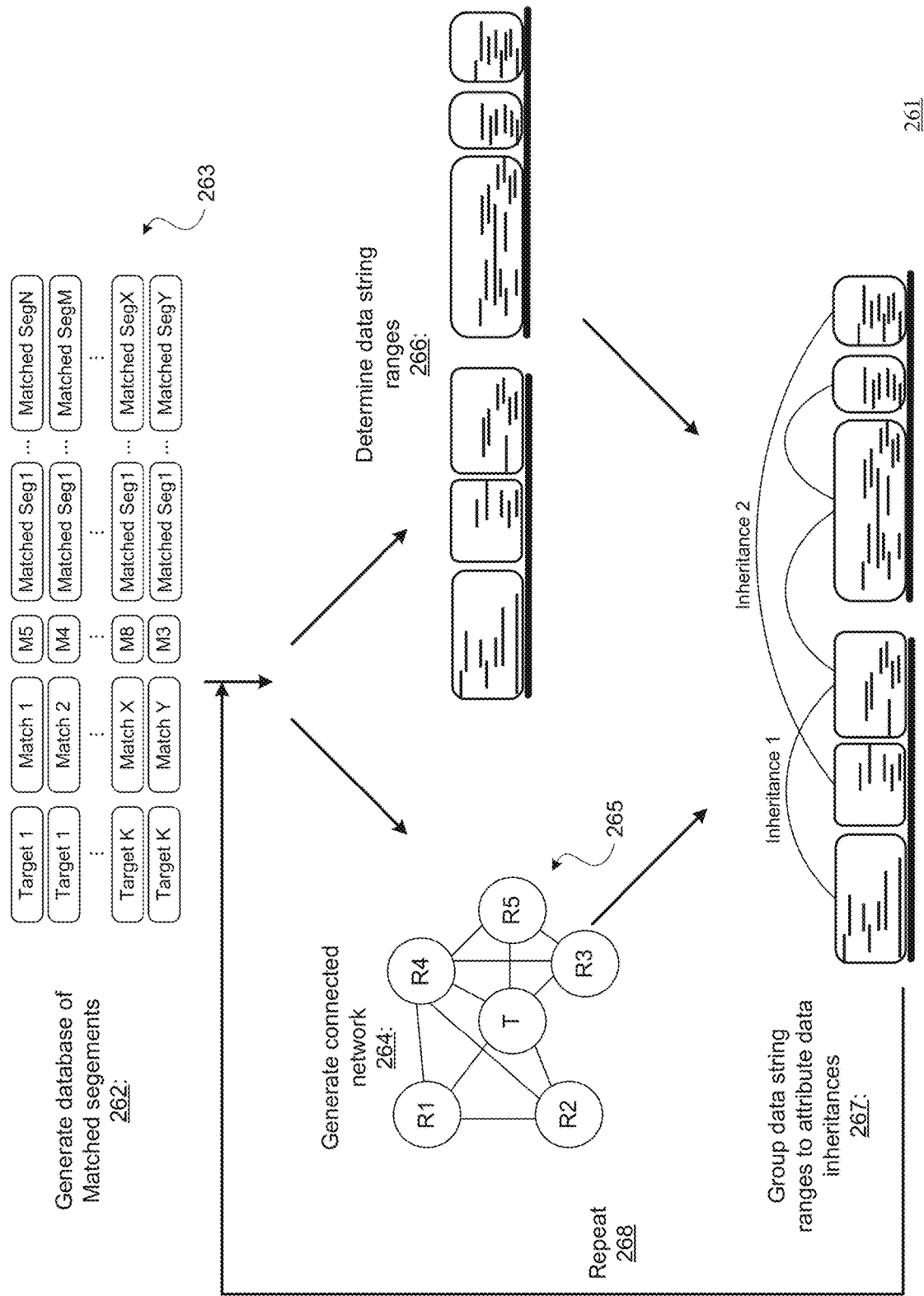
FIG. 2B is a conceptual diagram graphically illustrating an example process for determining data inheritances, in accordance with some embodiments.
Figure 2C:
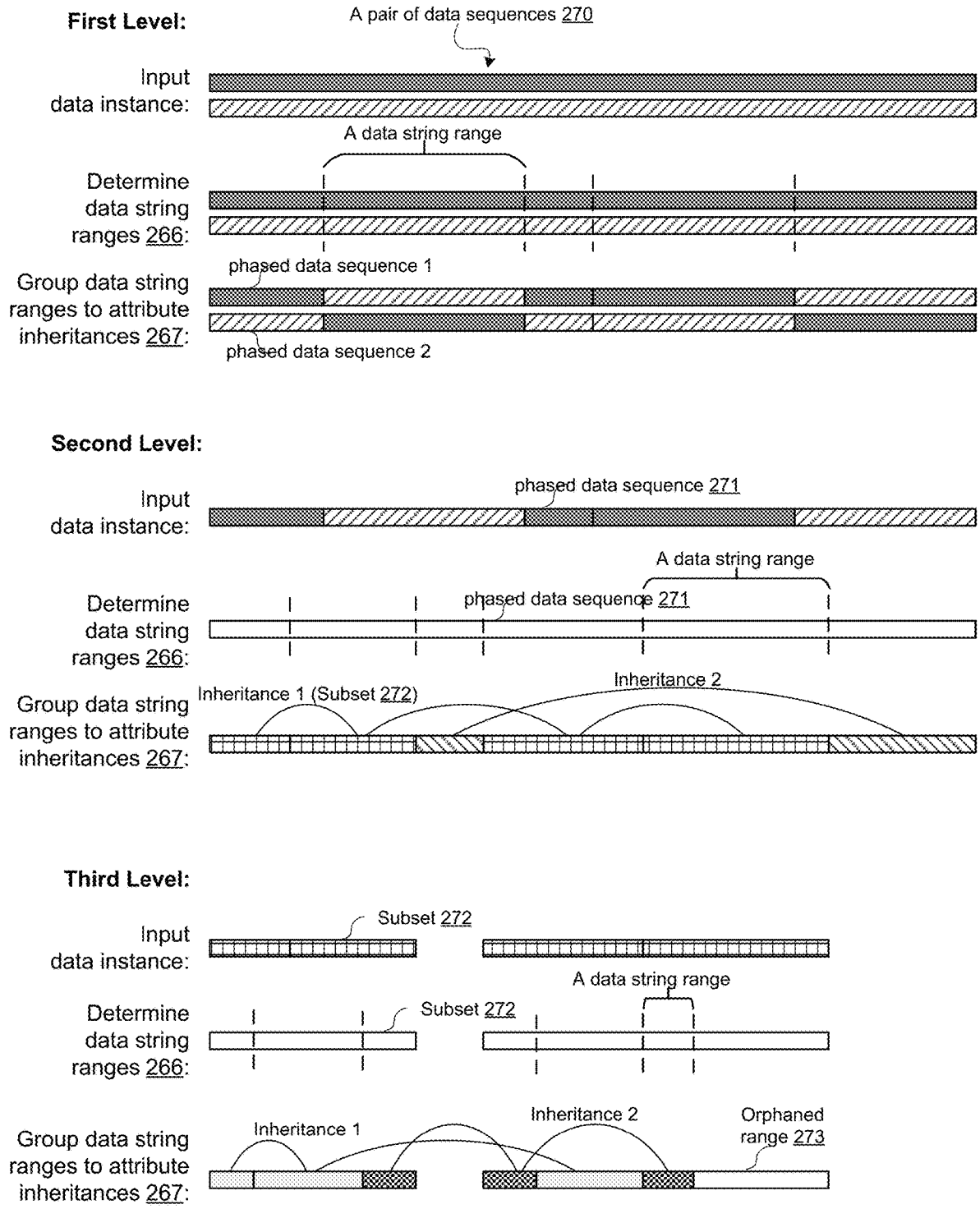
FIG. 2C is a conceptual diagram illustrating different levels of data inheritance separation, in accordance with some embodiments.
Figure 2D:
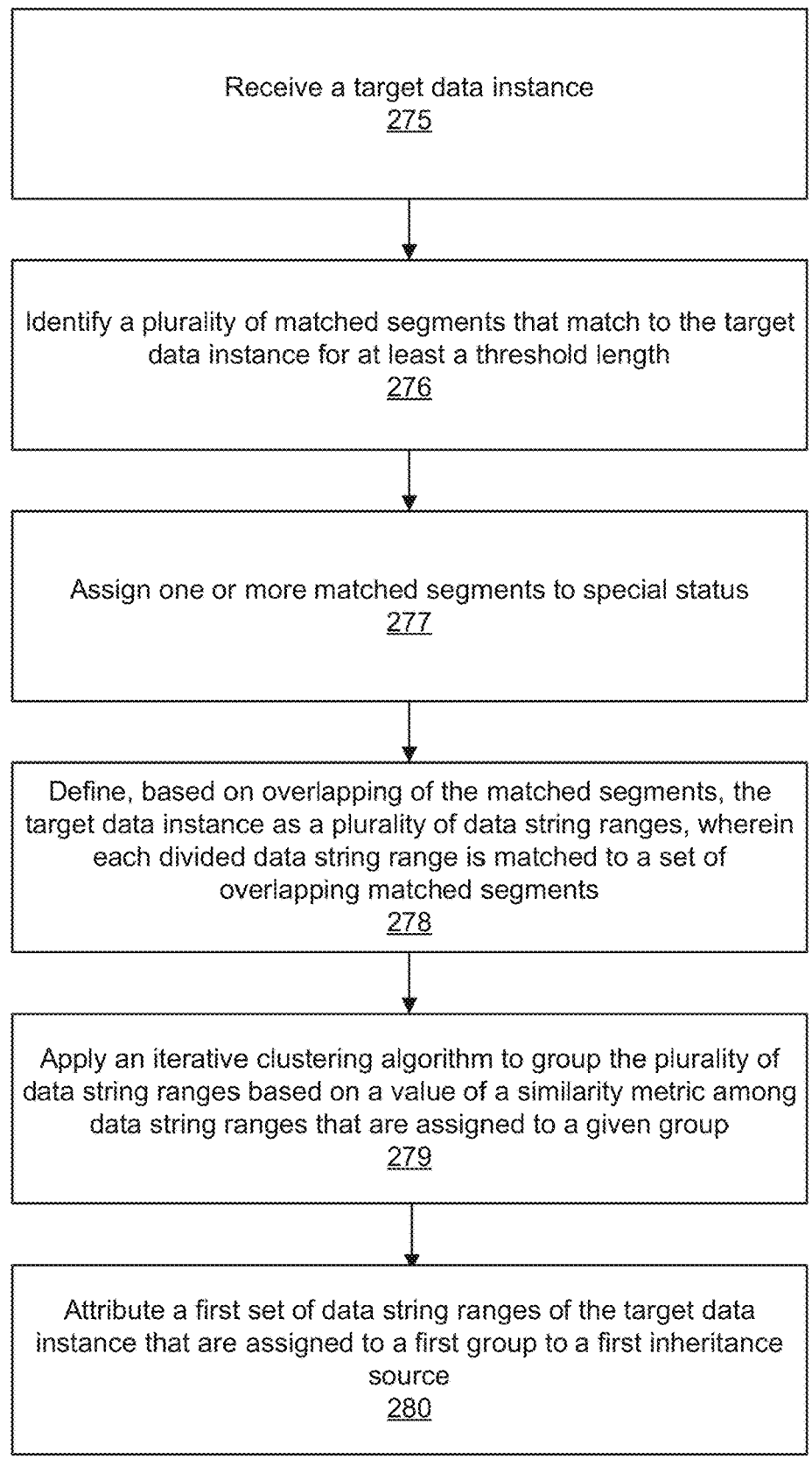
FIG. 2D is a flowchart depicting an example process for determining data inheritances of data segments which may belong to a named entity, such as a target individual, in accordance with some embodiments.

FIG. 2B is a conceptual diagram graphically illustrating an example process 261 for determining data inheritances, in accordance with some embodiments. FIG. 2C is a conceptual diagram illustrating different levels of data inheritance separation, in accordance with some embodiments. FIG. 2D is a flowchart depicting an example process 261 for determining data inheritances of data segments which may belong to a named entity, such as a target individual, in accordance with some embodiments. The process 261 may be embodied as a software algorithm that may be stored as computer instructions that are executable by one or more processors. The instructions, when executed by the processors, cause the processors to perform various steps in the process 261. In various embodiments, the process 261 may include additional, fewer, or different steps. While various steps in process 261 may be discussed with the use of computing server 130, each step may be performed by a different computing device. FIGS. 2B, 2C, and 2D are discussed in conjunction with each other.

Referring to FIG. 2B, the process 261 may include different stages. The details of each stage will be further discussed in FIG. 2D and subsequent figures.

In the stage 262, the computing server 130 may first generate a database of matched data instances 263. The database of matched data instances 263 includes various data instances that each has one or more data segments that match with other data instances. Each target data instance may be associated with a list of matched data instances. Each matched data instance may be associated with information about a list of matched segments that are matched to the target data instance's data string ranges.

Using the database of matched data instances 263, in stage 264, the computing server 130 may generate a network of data instances 265. The estimated degree of relatedness between two data instances may be determined based on the extent of data string matches in two data instances. The computing server 130 may look up the data of each closely matched data instance in the database of matched data instances 263 to see how each closely matched data instance is related to another closely matched data instance. The target data instance and the closely matched data instances may be represented as nodes and their relationships may be represented as edges. A network of data instances 265 may be constructed as a result.

Using the database of matched data instances 263, in stage 266, the computing server 130 may also determine data string ranges in the target data instance. The data string ranges are divided based on how matched segments of other data instances overlap with each other.

After the data string ranges are determined, at stage 267, the computing server 130 may group the data string ranges and attribute each group to a data inheritance. The grouping may be performed by one or more clustering techniques. The grouping may rely on the network of data instances 265. However, in some embodiments, the stage of generation 264 of a network of data instances 265 may be optional. In some embodiments, the computing server 130 may directly apply one or more clustering techniques to the data string ranges determined in stage 266. However, the use of the information from the network of data instances 265 may increase the accuracy of the grouping because the close data instances often are more informative in determining data inheritance. Various techniques used in the grouping process will be discussed in further detail below.

The process 261 of determining data inheritance may be repeatedly applied for additional levels as indicated by arrow 268. The database matched individuals 263 may be pre-built and the data may be fetched in each repeated application of the process 261.

Data inheritance may refer to how data patterns are passed down in various data inheritance sources. FIG. 2C is a conceptual diagram illustrating different levels of data inheritance separation that may be achieved by repeating the process 261. For example, at the first level of data inheritance separation, the target data instance may be a pair of data strings 270) which is unstructured. Structure of data strings may be referred to as phasing. The pair of data strings 270 is represented by two lines with different filled patterns. In some embodiments, even at the first level, the target data instance may be a single sequence of data strings.

At a second level of data inheritance separation, one of the structured (phased) data instances inherited from one of the data inheritance sources may be used as an input. For example, structured (phased) data instance 1 (labeled as structured (phased) data instance 271) from the first level is used as the input for the second level. The process 261 determines that a first subset of data string ranges of the structured (phased) data instance 271 is inherited from a first grand data inheritance source (data inheritance 1) and a second subset of data string ranges of the structured (phased) data instance 271 is inherited from a second grand data inheritance source (data inheritance 2).

The separation of data inheritances using the process 261 may further be repeated at a higher level to separate data inheritances from additional data inheritance sources that are further away. For example, at the third level of data inheritance separation, one of the subsets of data string ranges that belong to a data inheritance is used as an input. The subset illustrated is labeled as subset 272. The process 261 determines that certain data string ranges in the subset 272 belong to the first data inheritance and other data string ranges in the subset 272 belong to the second data inheritance. The process 261 may be further repeated.

At any level of data inheritance separation, one or more data string ranges may be unable to be classified as belonging to any group. This may be due to insufficient data or evidence to classify a range as a data inheritance. Such a range may be referred to as an orphaned range 273 and can occur at any level, not merely the third level as illustrated in FIG. 2C.

At any level of data inheritance separation, the input data may be referred to as the target data instance and the output segments that are grouped to two or more sides of data inheritances may be referred to as data string ranges. For example, at the first level of data inheritance separation, the target data instance may be a pair of data strings 270 and the data string ranges may be a pair of structured data instances that are each respectively assigned to a data inheritance source. At the second level of data inheritance separation, the target data instance may be a structured data instance 271 of a particular data inheritance source and the data string ranges may be segments of in the structured data instance.

Referring to FIG. 2D, a flowchart that provides additional detail of the process 261 is illustrated, in accordance with some embodiments. In some embodiments, process 261 can include receiving a target data instance. The target data instance may be any data instance that is stored in data store 200 or 205. For example, a target data instance may be data that is associated with a named entity such as a user of the computing server 130 and the named entity has data stored in the data store 200 or 205. The computing server 130 may process the data instance using the pre-processing engine 215 and store the processed data in the data store 205. A data instance may include a sequence of data bits. The sequence of data bits may include a long range of data reads from different data blocks.

As discussed, the process 261 may be repeated. The input for each level of separation may be a smaller set of the initial data instance.

The target data instance may be raw or processed, phased or unphased, depending on embodiments and situations. For example, in some embodiments, the target data instance may be processed by the sample pre-processing engine 215 and/or the engine 220. As discussed in further detail in this disclosure, the process 261 may serve as a phasing algorithm to separate a data instance into a pair of structured (phased) data instances (e.g., the first level of separation). In some embodiments, the process 261 may be applied repeatedly to determine the data inheritance of various data string ranges in the target data instance, as illustrated in FIG. 2C.

In some embodiments, the target data instance may start with a structured data instance that is inherited from a data inheritance source. In turn, the process 261 may break the structured data instance into two or more sets of data string ranges. The process 261 may assign a first set of data string ranges to a first grand data inheritance source and a second set of data string ranges to a second grand data inheritance source. In some embodiments, a repeated application of the process 261 to a new target data instance that includes only a particular set of data string ranges may further divide the particular set of data string ranges into two or more lines of data inheritance sources. For example, applying the process 261 to the first set of data string ranges that are determined to be inherited from the first data inheritance source may further divide the first set of data string ranges into multiple subsets that are respectively belonging to one or more data inheritance sources that passed down the data to the target data instance.

In some embodiments, the determination of data inheritance of data instances may be based on matched data instances (data instances that have one or more segments of data bits that match the target data instance) that are related to the target data instance in various degrees. Those matched data instances may be closely matched data instances, distantly matched data instances, and other matched data instances that share some degree of data inheritance with the target data instance. A large number of matched data instances are used to resolve, on a large scale, how a certain set of data segments passed down from a line of data inheritance sources.

By way of example, continuing with reference to FIG. 2D, in some embodiments, process 261 can include identifying 276 a plurality of matched segments that match to the target data instance for at least a threshold length (step 266). The matched segments may be based on position-specific data string matches and may be identified by comparing the data strings in the target data instance with a large number of other data instances that are stored in the computing server 130. The identification of those matched segments may be performed at stage 262. The data instance of a potentially matching data instance may be compared to the target data instance. Two segments (one from the potentially matching data instance and another from the target data instance) may be considered as no longer matching one or more mismatch sites are found. In some embodiments, the computing server 130 may tolerate a single or a small number of mismatched sites. The precise number of tolerated mismatched sites may be part of an iterative process of the process 261 to be further discussed below.

As many data instances may share data bits with the target data instance to a certain degree, a threshold length may be set to determine whether a matched segment is to be included in the process 261 as a matched data string segment. Various thresholds may be used, whether a threshold is static or dynamic, individualized or fixed across different target data instances.

Example Database of Matched Data Instances

In some embodiments, the determination of matched segments may be pre-determined before the runtime of the main algorithms of the process 261 that are used to determine data inheritance sources. The matched data may be stored in a database of matched data instances 263. The discussion of this section may be an example of the stage 262 in FIG. 2B. The database of matched data instances 263 may store data instances (whether a target data instance or a matched data instance) as 32-bit identifiers, a number of matched segments, total shared data bits and a list of matched segments. The list of matched segments may be in any suitable format, such as a semicolon-separated list of comma-separated pairs of data bit position identifiers. An example of such data structure is illustrated in the table below. The entire database may include a number of target data instances and the corresponding matched data instances of each target data instance.

| Target ID | Match ID | # of Matched Segments | Total length | Matched Segments Identifiers |
| --- | --- | --- | --- | --- |
| A2D1N1 | S1D2N0 | 1 | 12.77 | rs34982, rs23942 |
| A2D1N1 | K6D7N6 | 1 | 13.23 | rs32894, rs12310 |
| A2D1N1 | R2D1N1 | 1 | 10.16 | rs91241, rs81235 |
| A2D1N1 | D1L4D9 | 8 | 70.99 | rs93243, rs91245; rs77077, rs4077; . . . |
| . . . | | | | |
| A2D1N1 | C5D4N9 | 1 | 8.88 | rs61203, rs41294 |
| D9M7D9 | G2X2W2 | 1 | 10.01 | rs12345, rs28282 |
| . . . | | | | |

In some embodiments, the retrieval of data instances of potentially matched data instances may be from a large-scale database of matched data instances 263 as part of the data store 205. The large-scale database may take the format discussed in the table above. In some embodiments, the large-scale database of matched data instances 263 includes over 1,000 data instances. In some embodiments, the large-scale database of matched data instances 263 includes over 5,000 data instances. In some embodiments, the large-scale database of matched data instances 263 includes over 10,000 data instances. In some embodiments, the large-scale database of matched data instances 263 includes over 50,000 data instances. In some embodiments, the large-scale database of matched data instances 263 includes over 100,000 data instances. In some embodiments, the large-scale database of matched data instances 263 includes over 500,000 data instances. In some embodiments, the large-scale database of matched data instances 263 includes over 1,000,000 data instances.

In some embodiments, the size of the large-scale database of matched data instances 263 may be over 500 GB. In some embodiments, the size of the large-scale database of matched data instances 263 may be over ITB. In some embodiments, the size of the large-scale database of matched data instances 263 may be over 5 TB. In some embodiments, the size of the large-scale database of matched data instances 263 may be over 10 TB. In some embodiments, the size of the large-scale database of matched data instances 263 may be over 20 TB. In some embodiments, the size of the large-scale database of matched data instances 263 may be over 40 TB.

In some embodiments, to accelerate the entire process 261, the computing server 130 may optionally reduce a large-scale database of matched data instances 263 to a reduced set of closely matched data instances. Each closely matched data instance may share segments with the target data instance of a target data instance for at least a second threshold length that is larger than the first threshold length. For example, the second threshold length may be set as a certain length of bits that is larger than the first threshold. The rest of more distant matches are filtered and removed from the database. For example, in the table above, for the target data instance with the identifier A2D1N1, only the matched data instance with the identifier D1L4D9 is kept in the reduced set. The use of a reduced set of close data matches may significantly reduce the amount of data (e.g., from over 40 TB to 10 GB) to a size that is loadable into the random access memory (RAM) of the computing server 130. Since the entire set of the matched data may be loaded into the RAM, the rest of the process 261 may be significantly improved. The use of a reduced set of close data matches improves the operation of the computing process and meaningfully speeds up the process 261 by avoiding repeated process of loading and removing data from RAM.

Closely Matched Data Instances

Continuing with reference to FIG. 2D, in some embodiments, process 261 can include assigning one or more data string matched segments to special status (step 277). This step may also include determining the special relationship of some of the data instances of the target data instance and may correspond to an example of the stage 264 in FIG. 2B. A purpose of step 277 is to identify the relationships of closely matched data instances of the target data instance as precisely as possible based on the data from the database of matched data instances. In other words, based on the total length of shared data bits between a target data instance and a closely matched data instance, the computing server 130 may attempt to determine the precise special relationship between the target data instance and closely matched data instance (e.g., how the target data instance and the closely matched data instance are related by a real-life event). The computing server 130 may determine the special relationship as precise as possible, although in some cases examining the data bits alone may not be sufficient to determine the exact relationship.

Based on the identified relationships, one or more special status may be assigned to the corresponding matched segments of those closely matched data instances. One example of special status is an extra-informative match. In separating a target data instance into two or more data inheritances (e.g., separating data inheritances at the first level, or separating data inheritances at the second level, etc.), if a closely matched data instance is determined to be definite on one side of the data inheritance source, the matched segments of the close data instance are marked as extra-informative matches. Another example special status is unhelpful status. This type of close data instances is not useful for data inheritance separation. The matched segments of those close data instances are filtered out and not used in process 261.

In some embodiments, the filtering may be used to remove a close data instance that may not be helpful in separating data inheritances of a target data instance because the close data instance may share the same data inheritance sources of the target data instance. Conceptually, at any round of application of the process 261, the process 261 is to separate a set of data string ranges into two or more subsets that are passed down from different lines of data inheritance sources. If a closely matched data instance is determined to have data bits that are passed down from the exactly same lines of data inheritance sources as the target data instance, the data bits of the close data instance may not be helpful to separate the data inheritances of the data bits of the target data instance.

A purpose is to determine whether matched segments of closely matched data instances are specifically helpful or likely to be unhelpful in separating data inheritances. In one case, computing server 130 may identify a target data instance's closely matched data instance as a data instance as extra-informative. In another case, the computing server 130 may label another closely matched data instance as not helpful. Thus, the computing server 130 does not use the corresponding matched segments for separating data inheritance sources of the target data instance.

Referring to network 265 illustrated in FIG. 2B, all data instances are closely matched data instances of the target data instance T. R4 matches every body and is removed from the process 261, but R1, R2, R3 and R5 may be labeled as extra-informative. Furthermore, R1 and R2 match each other and may be considered to be on the same side of a data inheritance (e.g., a first data inheritance source). R3 and R5 may be considered to be on another data inheritance (a second data inheritance source).

In some embodiments, the computing server 130 may also consult other sources such as data from the data instance profile store 210 and tree management engine 260 to determine the familial relationship between a closely matched data instance and the target data instance. For example, the target data instance may have constructed one or more family trees whose data instances in the family tree have data instances stored in the computing server 130. The relationship between those data instances with the target data instance may be known and confirmed. The computing server 130 may use those relationships in assigning special status to the corresponding matched segments.

Segmenting and Grouping

Continuing with reference to FIG. 2D, in some embodiments, process 261 can include defining, based on overlapping of the data string matched segments, the target data instance as a plurality of data string ranges (step 278). In this step, the data string ranges are delimited from the target data instance. This step may be an example of the stage 266 in FIG. 2B. Each divided data string range is matched to a set of overlapping IBD-matched segments.

Continuing with reference to FIG. 2D, in some embodiments, process 261 can include applying an iterative clustering algorithm to group the plurality of data string ranges based on a value of a similarity metric among data string ranges that are assigned to a given group (step 279). This step may be an example of stage 267 in FIG. 2B. Grouping of the data string ranges separates various data string ranges into two or more sets. One set is classified to one of the data inheritances and another set is classified to another of the data inheritances.

In some embodiments, the similarity metric that is used to group the data string ranges may take various suitable forms. In some embodiments, a value of the similarity metric of two given data string ranges is determined based on lengths of matched segments. For example, say two given data string ranges are tentatively assigned to the same group, the computing server 130 may examine whether there is a matched data instance that has a first matched segment matched to the first data string range and a second matched segment matched to the second data string range. If so, the value of the similarity metric between these two data string ranges increases. In some embodiments, a value of the similarity metric of two given data string ranges is determined further based on (1) a first length of data string matched segment corresponding to a matched data instance in the first data string range of the two given data string ranges and (2) a second length of data string matched segment corresponds to the matched data instance's second-degree matches in a second data string range of the two given data string ranges.

Various examples of iterative clustering algorithms will be further discussed below: In some embodiments, the computing server 130 may examine a first candidate assignment that assigns a first candidate set of data string ranges to a given group. The computing server 130 may determine a first value of the similarity metric of the first candidate set. The computing server 130 may examine a second candidate assignment that assigns a second candidate set of data string ranges to the given group. The computing server 130 may determine a second value of the similarity metric of the second candidate set. The computing server 130) may select the first or the second candidate assignment based on the values of the similarity metric and may iteratively adjust the candidate assignments in a direction that increases the value of the similarity metric.

In some embodiments, the iterative clustering algorithm may include two or more stages. In some embodiments, the two or more stages may include a first clustering tree stage and a refinement (fine-tune) stage. For example, in the first clustering tree stage, the computing server 130 may construct a similarity matrix for the plurality of data string ranges. The similarity matrix may include values of the similarity metric of two given data string ranges. The computing server 130 may construct a clustering tree that assigns, based on the values in the similarity matrix, the plurality of data string ranges into positions of nodes in the clustering tree. The computing server 130 may divide the clustering tree into two or more branches. Each branch may include a plurality of nodes and corresponding to a group assignment. Details of the clustering tree stage will be discussed below.

Continuing with reference to FIG. 2D, in some embodiments, process 261 can include attributing a first set of data string ranges of the target data instance that are assigned to a first group to a first data inheritance and attribute a second set of data string ranges that are assigned to the second group to a second data inheritance (step 280). For example, at the level of data inheritance separation technique, the data string ranges may correspond to structured (phased) data instance segments. A first set of structured (phased) data instance segments is grouped and classified as inherited from a first data inheritance source. A second set of structured (phased) data instance segments is grouped and classified as inherited from a second data inheritance source. If the process 261 is applied again to one of the phased long-range structured (phased) data instances, now the target data instance is the phased long-range structured (phased) data instance. The structured (phased) data instance will be divided into a plurality of data string ranges. A first set of data string ranges may be grouped and classified as inherited from a first grand data inheritance source. A second set of data string ranges may be grouped and classified as inherited from a second grand data inheritance source.

In some embodiments, the computing server 130 may apply the iterative clustering algorithm again to the first set of data string ranges of the target data instance to group the first set of data string ranges into at least a subset of data string ranges. The subset of data string ranges is an earlier data inheritance source than the first data inheritance source. For example, for the data string ranges that are assigned to a grand data inheritance source, the process 261 may be applied again to further divide the data string ranges into two great-grand data inheritance sources.

Measuring Similarity

In some embodiments, the delimited data string ranges of the target data instance may be grouped using one or more clustering algorithms based on one or more objective goals that define how the data string ranges should be grouped. In some embodiments, the objective goals are related to similarity among the data string ranges.

Figure 2E:
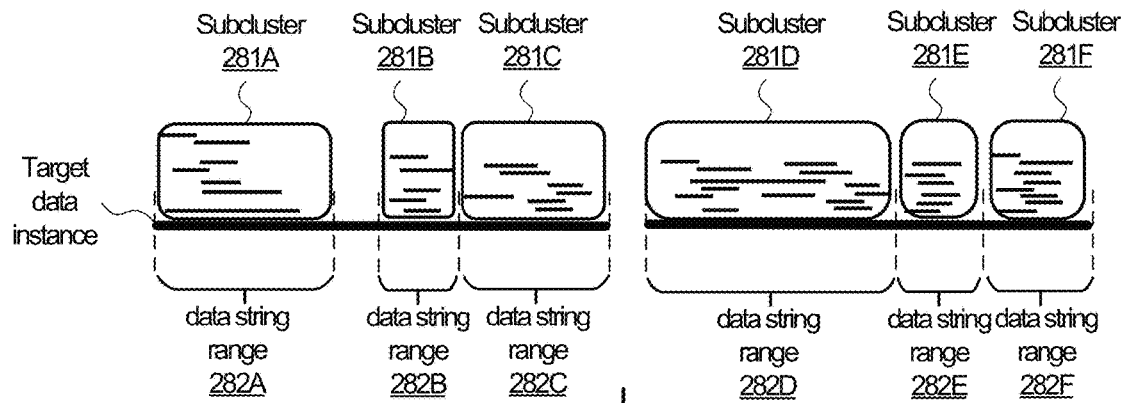
FIGS. 2E and 2F are conceptual diagrams illustrating the concept of similarity metric and clustering algorithms.
Figure 2E:
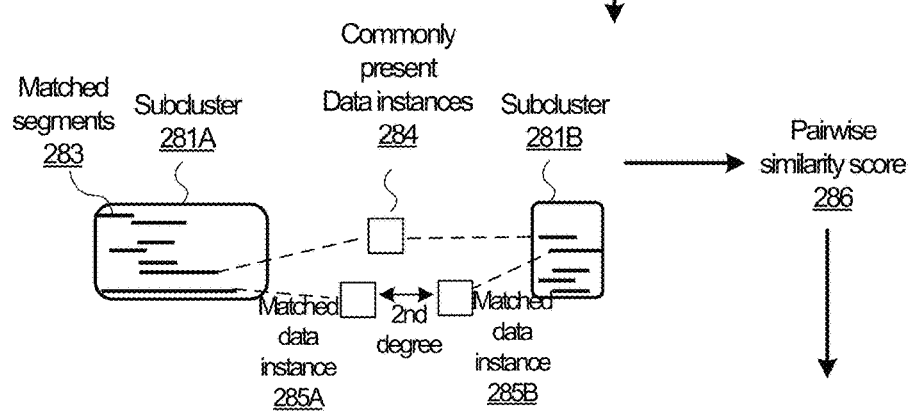
Figure 2E:
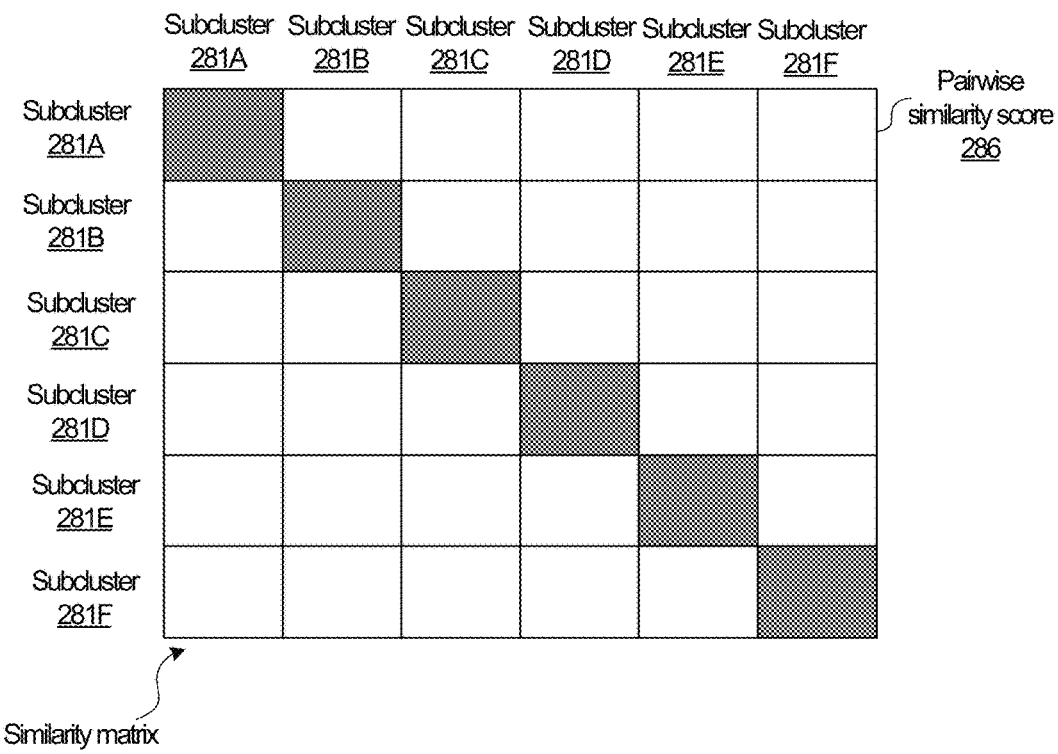
Figure 2F:
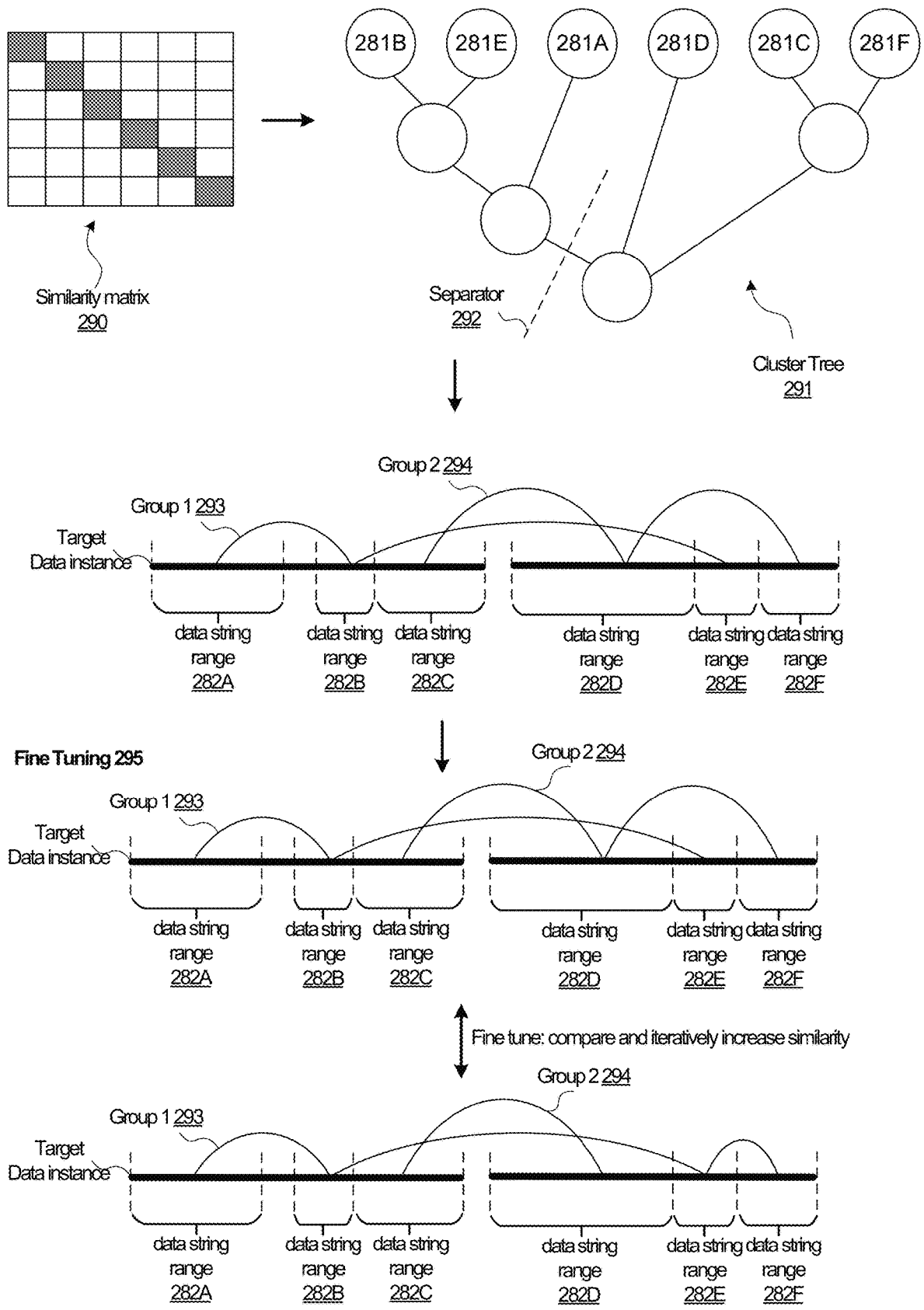

FIGS. 2E and 2F are conceptual diagrams illustrating the concept of similarity metric and clustering algorithms. The second level of separation of data inheritance is used to illustrate the similarity metric and clustering algorithms, but the concept may be applied to any level of separation. For the second level, the data instance may be a structured (phased) data instance. The target data instance is broken into a plurality of data string ranges 282A, 282B, 282C, 282D, 282E, and 282F (or generally, without specifying a particular data string range, 282). Each data string range has a corresponding subcluster 281 of matched segments that match one or more sub-range in the data string range. Hence, subclusters 281A, 281B, 281C, 281D, 281E, and 281F (or generally, without specifying a particular subcluster, 281) are also present. The number of data string ranges and subclusters is for illustration only. In an actual example, the computing server 130 analyzes a significantly more number of data string ranges.

For two given data string ranges, each data string range may correspond to a subcluster that contains a number of matched data instances. In some embodiments, using subclusters 281A and 281B as an example pair, the pairwise similarity of the two data string ranges 282A and 282B is measured with respect to (1) the matched data instances 284 that are commonly present in both of the corresponding subclusters 281A and 281B and (2) the matched segments 283 of those commonly present matched data instances 284. Since the matched data instances may be related to the target data instance, the more evidence supporting that two data string ranges 281A and 281B share a larger number of commonly matched data instances 284, the more likely that the data string ranges inherit the data strings from the same data inheritance group. Hence, two data string ranges with a high degree of similarity may be grouped together and be attributed to the same data inheritance source. In some embodiments, the similarity between data string ranges is measured by a similarity metric that compares the similarity of the matched data instances that are in the subclusters corresponding to the data string ranges.

In some embodiments, the similarity metric may take various suitable forms. In some embodiments, a value of the similarity metric of two given data string ranges 282 is determined based on lengths of matched segments 283 that belong to a commonly present matched data instance 284 whose segments are classified as matched segments that fall within two given data string ranges 282. The value of the similarity metric may be referred to as a similarity score 286. For example, say two given data string ranges are tentatively assigned to the same group, the computing server 130 may examine whether there is a matched data instance which has a first matched segment that falls within the first data string range and a second matched segment that falls with the second data string range. If so, the matched data instance is a commonly present matched data instance 284, and the value of the similarity metric between these two data string ranges increases. In some embodiments, the value may be increased based on the number of commonly present matched data instances 284 in the two data string ranges. For example, the computing server 130 may be able to find more than one commonly present matched data instances 284. Alternatively, or additionally, the value may be based on the lengths of the two data string matched segments 283 that belong to the same commonly present matched data instance 284. In some embodiments, the similarity score may further increase if the commonly present matched data instance 284 is marked as extra-informative close data instance, for example, by weighing the score contribution from the matched segments of the extra-informative close data instance more heavily than other regular commonly present matched data instances.

In some embodiments, the computing server 130 may relax the criteria of what qualifies as a commonly present match data instance in two subclusters. In some embodiments, the commonly present matched data instance 284 is defined as the same data instance 284 who has two matched segments each respectively in one of the subclusters. In some embodiments, to reduce the number of the orphaned segment (e.g., illustrated as orphaned segment 273 that is not able to be linked to any group), the commonly present matched "data instance" is in fact a pair of matched data instances 285A and 285B who are closely matched data instances to each other. This second-degree relationship may be used to relax the criteria. In a relaxed selection of commonly present matched "data instance," a first data instance 285A, and a second data instance 285B, which are closely matched with each other, are respectively present in one of the subclusters but neither of them is commonly present in both subcluster. In other words, a matched segmented 283 of the first data instance 285A is matched to the first data string range (e.g., 282A) of the target data instance so that the first data instance 285A is present in the corresponding first subcluster 281A. A matched segmented 283 of the second data instance 285B is matched to the second data string range (e.g., 282B) of the target data instance so that the second data instance 285B is present in the corresponding second subcluster 281B. In such a case, in calculating the similarity matrix, the computing server 130 may consider that a commonly present matched "data instance" exists. In such a case, the similarity score 286 between subclusters 281A and 281B increases because matched data instances 285A and 285B are close data instances, even though they are not the same data instance. However, the weight of this type of second-degree relationship towards the value of the similarity metric may be reduced compared to a true commonly present matched data instance 284. In some embodiments, if it is determined that both matched data instances 285A and 285B are also close data instances of the target data instance, the second-degree relationship may be less discounted and is weighed more to the overall score.

By way of a specific example, in some embodiments, the similarity score 286 is a sum of the average (harmonic mean) for each pair of segments 283 that connect two subclusters. In some embodiments, these connections are downweighed significantly if the connections are based on a distant second-degree relationship between the two matches.

Different embodiments may use various ways to calculate the similarity between subclusters 281. In some embodiments, the similarity between two subclusters 281 may be based on a number of matched segments 283 whose corresponding data instances are shared between the two subclusters 281. In other words, it is based on the number of matched segments 283 in the two subclusters 281 whose corresponding matched data instances are the same. In some embodiments, the similarity between two subclusters 281 may be further based on the number of second-degree relationships. In other words, it is based on the number of matched segments 283 in the two subclusters 281 whose corresponding matched data instances are data instances of each other. In some embodiments, the similarity between two subclusters 281 may further be based on a combination of the number of matched segments in the two subclusters whose corresponding data instances are the same, and the number of matched segments in the two subclusters whose corresponding data instances are matches of each other.

In some embodiments, for second level or above data inheritance separation, a similarity score 286 may further be adjusted based on additional real-life events that may be able to be modeled. In some embodiments, real-life events may be modeled. One or more breaking points in a data string may be identified. By identifying a breakpoint for the data instances, two data string ranges may be delimited, one left to the breaking point and one right to the breaking point. Two data string ranges, one at each side of the breaking point, may be determined to be separate because these two data string ranges are likely separately inherited from different lines of data inheritance sources. A negative similarity weight may be applied to the similarity score 286 of these two data string ranges because of the determined likely real-life breaking event.

The precise weights of various factors that affect a similarity score 286, such as factors like having true commonly present matched data instances, a commonly present matched data instance being extra-informative, the second-degree relationships, and the breaking events, may be parameterized and may be adjusted based on experimental results and/or based on training data if one or more machine learning models are trained to model the weights.

Referring back to FIG. 2E, in some embodiment, using the values of similarity metrics between many different pairs of subclusters 281 that each corresponds to a pair of data string ranges 282, a similarity data object such as a similarity matrix 290 can be constructed. The similarity matrix 290 may record the similarity scores 286 between any pairs of subclusters 281. For the separation of two data inheritances (e.g., phasing data inheritance source 1 and data inheritance source 2 at the first level, phasing grand data inheritance source 1 and grand data inheritance source 2 at the second level), for any subclusters A and B, a first similarity score 286 may be monitored data instance to the subcluster A and subcluster B that are classified to the same group. A second similarity score 286 may also be monitored data instance to the subcluster A and subcluster B that are classified into two different groups. For other pairs of subclusters, equivalent similarity scores 286 may be stored and a similarity matrix 290 can be constructed.

While in this disclosure similarity matrix 290 is used as an example, in some embodiments, dissimilarity matrix may also be used. The similarity matrix 290 in various embodiments may be defined positively to measure a degree of similarity or negatively to measure a degree of dissimilarity.

Example Tree Clustering Approach

In various embodiments, one or more different types of iterative clustering algorithms may be applied at different levels of data inheritance separation. For example, in the second level of data inheritance separation where two grand data inheritance sources' data inheritances are separated from a structured (phased) data instance, a tree clustering approach may be used. In some embodiments, the tree clustering approach may be used at every level of data inheritance separation.

Continuing the illustration to FIG. 2F, in some embodiments, a similarity matrix 290 that is discussed above is constructed based on pairwise similar scores 286 between different pairs of subclusters 281. A hierarchical clustering algorithm such as the unweighted pair group method with arithmetic mean (UPGMA) may be used to construct a cluster tree 291 using each subcluster 281 as a node in the tree. The subclusters 281 that have higher similarity score 286 are grouped closer in the tree 291. Pairs or sets of subclusters with the highest similarity scores 286 are placed in the deepest root in the tree based on the construct of the hierarchical clustering algorithm. In some embodiments, the tree 291 constructed is a binary and rooted tree. After the tree 291 is constructed, the computing server 130 may determine the best location for a group separator 292 to be placed to separate the tree leaves (nodes) into two (or more) groups 293 and 294, each group corresponding to a data inheritance. For example, the interior nodes that are rooted deeper than the group separator 292 are assigned to one group and the rest of the nodes in the tree are assigned to another group. The grouping of the subclusters 281 may be translated to the grouping of data string ranges 282. Hence, group 1 540 and group 2 294 of data string ranges may be assigned.

In some embodiments, the selection of the location of the group separator 292 may be selected iteratively based on one or more objective goals. In some embodiments, one of the objective goals may be to maximize the total similarity score among the nodes in a group. For example, a candidate group separator may be tentatively placed and the total similarity score of a group based on the placement of the candidate group separator may be calculated. The total similarity score may be a simple sum, a weighted sum, or another form of statistical aggregation. In some embodiments, for example, the similarity scores may be multiplied by the probability density of expected data inheritance, such as the amount of data bits that would be assigned as inherited (e.g., inherited by one grand data inheritance source at the second level of separation). The probability density may be modeled as a Gaussian parameter empirically. The total similarity score is adjusted according by the probability density of this data instance imbalance assignment. In some embodiments, another candidate group separator is considered, and the total similarity score is calculated and may also be adjusted based on the probability density of data inheritance. The process may be repeated until the best candidate group separator is found.

Example Fine-Tuning of Group Assignment

In some embodiments, a clustering approach may be a two-stage approach. After one or more clustering algorithms are applied, a fine-tuning process 295 may be executed to further adjust the group assignment of the data string ranges. For example, in some embodiments, the result of the tree clustering approach may be served as an initial assignment of two groupings 293 and 294 of data string ranges 282. A fine-tuning process 295 in a refinement stage may be executed to further adjust the group assignment based on the initial assignment.

In some embodiments, in the refinement stage (fine tuning), the computing server 130 may examine a candidate assignment. The computing server 130 may determine an objective function based on the similarity metric. The computing server 130 may swap, iteratively, one or more data string ranges from a first group to a second group or vice versa to improve the value of the objective function. For example, as illustrated at the bottom of FIG. 2F, the data string range 282F is switched from group 2 to group 1. In some embodiments, the objective function may be based on a distribution of real-life data events.

By way of example, the objective function may measure the connection similarity score among both group assignments of data string ranges. For example, at the second level of data inheritance separation, the objective function may be the sum of the scores of each pair of segments assigned to the same grand data inheritance source. In some embodiments, the objective function may be based on multiple factors in addition to the sum of the similarity scores. In some embodiments, additionally or alternatively, the objective function is factored by the probability density of the total amount of data string ranges assigned to each data inheritance, modeled as a Gaussian distribution with a mean that is at the expected mean. For example, for the second level of separation, the expected mean of each data inheritance is modeled at 0.25. In some embodiments, additionally or alternatively, the objective function is factored by the probability density of the number of recombination events of each data inheritance, modeled as a Gaussian distribution with a mean that is at the expected mean. For example, for the second level of separation, the expected mean of the number of recombination is at around 35 based on an empirical study of recombination in a population. The standard deviations of the Gaussian distributions may be determined empirically and may be selected based on empirical results.

In some embodiments, an example of the objective score S for an assignment A is $$S(A,M)=N(C(A),0.25,0.12){\times}N(R(A),34.9,24){\times}\Sigma_{i,j}\delta(Ai, Aj){\times}M(Ai,Aj) \quad (1)$$

where $N(x, \mu, \sigma)$ is the PDF at point x of a normal distribution with mean $\mu$ and standard deviation $\sigma$, $C(A)$ is the proportion of data string assigned to a data inheritance given the assignment A, $\delta(a_1, a_2)$ is +1 if $a_1$ and $a_2$ are the same (assigned to the same data inheritance) and −1 otherwise, and $M(a_1, a_2)$ is the similarity score (the strength of the connection between two subclusters) of the two data string regions $a_1$ and $a_2$.

In some embodiments, the computing server 130 may create several threads for iterations. Each thread may start with the initial assignment generated by the clustering algorithm in the first stage. Each thread may perform a random-walk style search for an improved solution. The random walk may include flipping one data string range from one group to the other. At each step, a change with a probability proportional to the improvement in score may be chosen, taking over the space of changes to the score of all possible changes (e.g., the worst move as probability zero). After some number of iterations or when the fine-tune algorithm's result converges, the probabilistic-random-walk may be stopped or may continue to choose only the strictly best improvement for a few more steps until there is no change to assignment that increases the objective score. Multiple threads of iterations (e.g., 64) may be used, each starts with a different random walk. The assignment in one of the threads with the highest objective score may be chosen as the final assignment.

Example Machine Learning Models

In various embodiments, a wide variety of machine learning techniques may be used. Examples include different forms of supervised learning, unsupervised learning, and semi-supervised learning such as clustering algorithms decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. For example, various clustering tasks for grouping of genomic ranges and other processes described herein may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to separate data bit ranges (e.g., genomic ranges) into two groups, the training samples may include known data bit features and corresponding subclusters' features. The labels for each training sample may be binary or multi-class. In training a machine learning model for separating genomic ranges, the training labels may include a first label for the first group and a second label for the second group.

By way of example, the training set may include known individuals' genomic ranges and corresponding matched segments. Each training sample in the training set may correspond to a past and the corresponding outcome may serve as the label for the sample. A training sample may be represented as a feature vector that include multiple dimensions. Each dimension may include features in a genomic range, features in a subclusters and features in matched segments.

In some embodiments, an unsupervised learning technique may be used. The training samples used for an unsupervised model may also be represented by features vectors, but may not be labeled. Various unsupervised learning techniques such as clustering may be used in determining similarities among the feature vectors, thereby categorizing the training samples into different clusters. Similarities among genomic ranges are discussed extensively above.

A machine learning model may be associated with an objective function, which generates a metric value that describes the objective goal of the training process. The training process may intend to reduce the error rate of the model in generating predictions. In such a case, the objective function may monitor the error rate of the machine learning model. In a model that separates genomic ranges, the objective function of the machine learning algorithm may be a similarity function that monitor the overall similarity among genomic ranges in a group, as discussed above.

A machine learning model may include certain layers, nodes, weights and/or coefficients. Training of a machine learning model may include forward propagation and backpropagation. Each layer in a model may include one or more nodes, which may be fully or partially connected to other nodes in adjacent layers. Clustering algorithms may take a different structure such as representing each genomic range as a node. In forward propagation, the machine learning algorithm performs the computation in the forward direction. Training of a machine learning model may include an iterative process that includes iterations of making determinations, monitoring the performance of the machine learning model using the objective function, and backpropagation to adjust the weights (e.g., weights, kernel values, coefficients). The computing device may adjust, in a backpropagation, the weights of the machine learning model based on the comparison. The computing device backpropagates one or more error terms obtained from one or more loss functions to update a set of parameters of the machine learning model. The backpropagating may be performed through the machine learning model and one or more of the error terms based on a difference between a label in the training sample and the generated predicted value by the machine learning model.

By way of example, the parameters in a machine learning model may be associated with different coefficients (e.g., weights and coefficients) that are adjustable during training. After an input is provided into the machine learning model in the forward direction, the results may be compared to the training labels or other values in the training set to determine the machine learning model performance. The process of prediction may be repeated for other samples in the training sets to compute the value of the objective function in a particular training round. In turn, the machine learning model performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples.

In various embodiments, the training samples described above may be refined and continue to re-train the model, which the model's ability to perform the inference tasks. In some embodiments, this training and re-training processes may repeat, which results in a computer system that continues to improve its functionality through the use-retraining cycle.

Computing Machine Architecture

Figure 3:
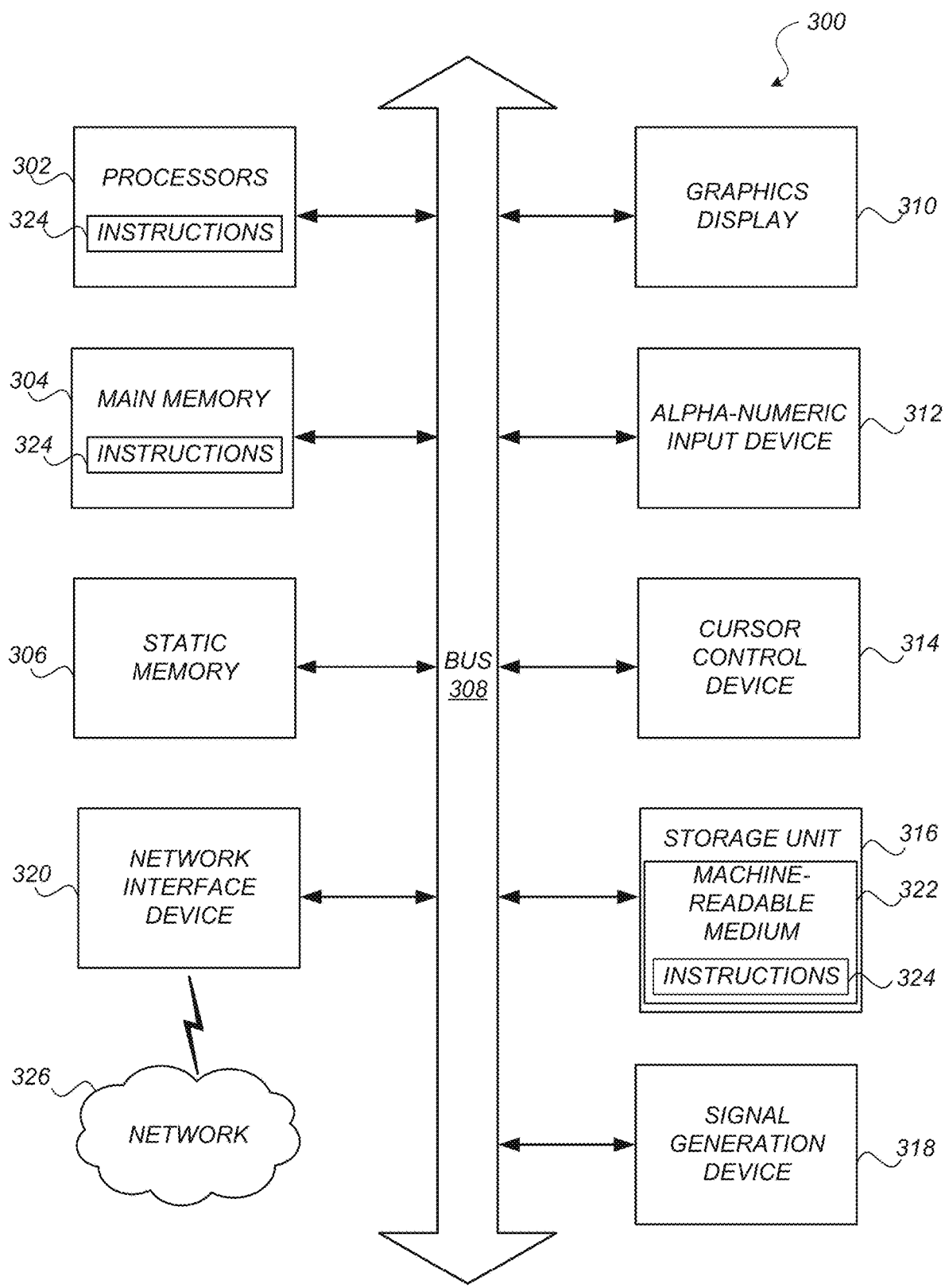
FIG. 3 is a block diagram of an example computing device, in accordance with some embodiments.

FIG. 3 is a block diagram illustrating components of an example computing machine that is capable of reading instructions from a computer-readable medium and execute them in a processor (or controller). A computer described herein may include a single computing machine shown in FIG. 3, a virtual machine, a distributed computing system that includes multiple nodes of computing machines shown in FIG. 3, or any other suitable arrangement of computing devices.

By way of example, FIG. 3 shows a diagrammatic representation of a computing machine in the example form of a computer system 300 within which instructions 324 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 3 may correspond to any software, hardware, or combined components shown in FIGS. 1 and 2, including but not limited to, the client device 30, the computing server 130, and various engines, interfaces, terminals, and machines shown in FIG. 2A. While FIG. 3 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IOT) device, a switch or bridge, or any machine capable of executing instructions 324 that specify actions to be taken by that machine. Further, while only a single machine is illustrated, the term "machine" and "computer" may also be taken to include any collection of machines that individually or jointly execute instructions 324 to perform any one or more of the methodologies discussed herein.

The example computer system 300 includes one or more processors 302 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 300 may also include a memory 304 that store computer code including instructions 324 that may cause the processors 302 to perform certain actions when the instructions are executed, directly or indirectly by the processors 302. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 302 and reduces the space required for the memory 304. For example, the database processing techniques and machine learning methods described herein reduce the complexity of the computation of the processors 302 by applying one or more novel techniques that simplify the steps in training, reaching convergence, and generating results of the processors 302. The algorithms described herein also reduces the size of the models and datasets to reduce the storage space requirement for memory 304.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors.

The computer system 300 may include a main memory 304, and a static memory 306, which are configured to communicate with each other via a bus 308. The computer system 300 may further include a graphics display unit 310 (e.g., a plasma display panel (PDP), a liquid crystal display (LCD), a projector, or a cathode ray tube (CRT)). The graphics display unit 310, controlled by the processors 302, displays a graphical user interface (GUI) to display one or more results and data generated by the processes described herein. The computer system 300 may also include alpha-numeric input device 312 (e.g., a keyboard), a cursor control device 314 (e.g., a mouse, a trackball, a joystick, a motion sensor, or other pointing instruments), a storage unit 316 (a hard drive, a solid-state drive, a hybrid drive, a memory disk, etc.), a signal generation device 318 (e.g., a speaker), and a network interface device 320, which also are configured to communicate via the bus 308.

The storage unit 316 includes a computer-readable medium 322 on which is stored instructions 324 embodying any one or more of the methodologies or functions described herein. The instructions 324 may also reside, completely or at least partially, within the main memory 304 or within the processor 302 (e.g., within a processor's cache memory) during execution thereof by the computer system 300, the main memory 304 and the processor 302 also constituting computer-readable media. The instructions 324 may be transmitted or received over a network 326 via the network interface device 320.

While computer-readable medium 322 is shown in an example embodiment to be a single medium, the term "computer-readable medium" should be taken to include a single medium or multiple media (e.g., a centralized or distributed database, or associated caches and servers) able to store instructions (e.g., instructions 324). The computer-readable medium may include any medium that is capable of storing instructions (e.g., instructions 324) for execution by the processors (e.g., processors 302) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration: it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Pat. No. 11,429,615, entitled "Linking Individual Datasets to a Database," granted on Aug. 30, 2022, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

The invention claimed is:

1. A computer-implemented method for determining data inheritance of data segments, the computer-implemented method comprising:
   receiving a target data instance;
   identifying a plurality of matched data segments that match to the target data instance for at least a threshold length;
   dividing, based on overlapping of the matched data segments, the target data instance as a plurality of data string ranges, wherein each divided data string range is matched to a set of overlapping matched data segments;
   applying an iterative clustering algorithm to group the plurality of data string ranges based on values of a similarity metric among data string ranges that are assigned to a given group; and
   attributing a first set of data string ranges that are assigned to a first group to a first data inheritance.

2. The computer-implemented method of claim 1, wherein the target data instance is a structured data instance, and the iterative clustering algorithm assigns the first set of data string ranges to a first data inheritance source belong to the first data inheritance and the iterative clustering algorithm assigns a second set of data string ranges to a second data inheritance source.

3. The computer-implemented method of claim 1, wherein the matched data segments are retrieved from a database of close data matches, each close data match sharing a total length with the target data instance for at least a second threshold length that is larger than the threshold length.

4. The computer-implemented method of claim 1, wherein dividing the target data instance as a plurality of data string ranges comprises:
   identifying a plurality of informative sites, an informative site being a site with heterogeneous position-specific data string value values in the target data instance and a homogeneous data value in two or more matched data segments,
   identifying a conflicting informative site, the conflicting informative site being an informative site where the two or more matched data segments have contradicting homozygous position-specific data string values at the conflicting informative site,
   breaking up at least one of the matched data segments of the two or more matched data segments at a breakpoint based on the conflicting informative site, and
   delimiting two data string ranges of the target data instance at the breakpoint.

5. The computer-implemented method of claim 1, wherein the iterative clustering algorithm comprises:
   examining a first candidate assignment that assigns a first candidate set of data string ranges to a given group,
   determining a first value of the similarity metric of the first candidate set,
   examining a second candidate assignment that assigns a second candidate set of data string ranges to the given group,
   determining a second value of the similarity metric of the second candidate set, and
   selecting the second candidate assignment.

6. The computer-implemented method of claim 1, wherein the iterative clustering algorithm comprises:
examining a candidate assignment,
determining an objective function is based on the similarity metric,
swapping, iteratively, one or more data string ranges from a first group to a second group or vice versa to improve a value of the objective function.

7. The computer-implemented method of claim 6, wherein the objective function is further based on a distribution of real-life data events.

8. The computer-implemented method of claim 1, wherein a value of the similarity metric of two given data string ranges is determined based on lengths of matched data segments corresponding to a matched data instance whose segments are classified as matched data segments in both of the two given data string ranges.

9. The computer-implemented method of claim 1, further comprising:
identifying a data expression;
determining the data expression is attributable to position-specific data string values in the first set of data string ranges; and
reporting that the data expression of the target data instance is passed down from the first data inheritance.

10. The computer-implemented method of claim 1, wherein the plurality of matched data segments are matched based on data bits.

11. A system comprising:
one or more processors; and
memory configured to store code comprising instructions, wherein the instructions, when executed by the one or more processors, cause the one or more processors to perform:
receiving a target data instance;
identifying a plurality of matched data segments that match to the target data instance for at least a threshold length;
dividing, based on overlapping of the matched data segments, the target data instance as a plurality of data string ranges, wherein each divided data string range is matched to a set of overlapping matched data segments;
applying an iterative clustering algorithm to group the plurality of data string ranges based on values of a similarity metric among data string ranges that are assigned to a given group;
attributing a first set of data string ranges of the target data instance that are assigned to a first group to a first data inheritance; and
applying the iterative clustering algorithm again to the first set of data string ranges of the target data instance to group the first set of data string ranges into at least a subset of data string ranges, the subset of data string ranges an earlier data inheritance in the first data inheritance.

12. The system of claim 11, wherein the target data instance is a structured data instance, and the iterative clustering algorithm assigns the first set of data string ranges to a first data inheritance source belong to the first data inheritance and the iterative clustering algorithm assigns a second set of data string ranges to a second data inheritance source.

13. The system of claim 11, wherein the matched data segments are retrieved from a database of close data matches, each close data match sharing IBD with the target data instance for at least a second threshold length that is larger than the threshold length.

14. The system of claim 11, wherein defining the target data instance as a plurality of data string ranges comprises:
identifying a plurality of informative sites, an informative site being a site with heterogeneous position-specific data string value values in the target data instance and a homogeneous data value in two or more matched data segments,
identifying a conflicting informative site, the conflicting informative site being an informative site where the two or more matched data segments have contradicting homozygous position-specific data string values at the conflicting informative site,
breaking up at least one of the matched data segments of the two or more matched data segments at a breakpoint based on the conflicting informative site, and
delimiting two data string ranges of the target data instance at the breakpoint.

15. A non-transitory computer-readable medium configured to store code comprising instructions, wherein the instructions, when executed by one or more processors, cause the one or more processors to perform:
receiving a target data instance;
identifying a plurality of matched data segments that match to the target data instance for at least a threshold length;
dividing, based on overlapping of the matched data segments, the target data instance as a plurality of data string ranges, wherein each divided data string range is matched to a set of overlapping matched data segments;
applying an iterative clustering algorithm to group the plurality of data string ranges based on values of a similarity metric among data string ranges that are assigned to a given group; and
attributing a first set of data string ranges of the target data instance that are assigned to a first group to a first data inheritance; and
applying the iterative clustering algorithm again to the first set of data string ranges of the target data instance to group the first set of data string ranges into at least a subset of data string ranges, the subset of data string ranges an earlier data inheritance in the first data inheritance.

16. The system of claim 11, wherein the iterative clustering algorithm includes two or more stages, and the two or more stages include a first clustering tree stage and a refinement stage.

17. The system of claim 11, wherein the iterative clustering algorithm comprises:
constructing a similarity matrix for the plurality of data string ranges, the similarity matrix comprises values of the similarity metric of two given data string ranges,
constructing a clustering tree that assigns, based on the values in the similarity matrix, the plurality of data string ranges into positions of nodes in the clustering tree, and
dividing the clustering tree into two or more branches, each branch comprising a plurality of nodes and corresponding to a group assignment.

18. The system of claim 11, wherein a value of the similarity metric of two given data string ranges is determined based on lengths of matched data segments corresponding to a matched data instance whose segments are classified as matched data segments in both of the two given data string ranges; and wherein a value of the similarity metric of two given data string ranges is determined further based on (1) a first length of data string matched segment corresponding to a matched data instance in a first data string range of the two given data string ranges and (2) a second length of data string matched segment correspond to the matched data instance's second-degree relative in a second data string range of the two given data string ranges.

19. The system of claim 11, wherein the instructions, when executed, further cause the one or more processors to perform a filtering to remove one or more matched data segments prior to applying the iterative clustering algorithm, wherein the filtering comprises:
  determining one or more candidate matched data segments belonging to potential descendant of two or more data inheritances,
  identifying, from the one or more candidate matched data segments, a data string matched segment that belong to a descendant of the two or more data inheritances, and
  removing the identified data string matched segment.

20. The system of claim 11, wherein the instructions, when executed, further cause the one or more processors to perform:
  applying the iterative clustering algorithm again to the first set of data string ranges of the target data instance to group the first set of data string ranges into at least a subset of data string ranges, the subset of data string ranges an earlier data inheritance in the first data inheritance.

* * * * *